(12) United States Patent
Carpenter et al.

(10) Patent No.: US 9,741,051 B2
(45) Date of Patent: Aug. 22, 2017

(54) TOKENIZATION AND THIRD-PARTY INTERACTION

(71) Applicant: Visa International Service Association, San Francisco, CA (US)

(72) Inventors: Andrew Carpenter, Belmont, CA (US); Glenn Powell, Fremont, CA (US); Patrick Stan, Pacifica, CA (US); Ryan Hagey, Alameda, CA (US); Michael Mori, San Mateo, CA (US); Steve Cracknell, San Mateo, CA (US); Mark Carlson, Half Moon Bay, CA (US); Gourab Basu, Half Moon Bay, CA (US)

(73) Assignee: Visa International Service Association, San Francisco, CA (US)

(*) Notice: Subject to any disclaimer, the term of this patent is extended or adjusted under 35 U.S.C. 154(b) by 315 days.

(21) Appl. No.: 14/146,655

(22) Filed: Jan. 2, 2014

(65) Prior Publication Data
US 2014/0188586 A1    Jul. 3, 2014

Related U.S. Application Data

(60) Provisional application No. 61/751,412, filed on Jan. 11, 2013, provisional application No. 61/748,435, filed on Jan. 2, 2013.

(51) Int. Cl.
*G06Q 30/00* (2012.01)
*G06Q 30/02* (2012.01)
(Continued)

(52) U.S. Cl.
CPC ......... *G06Q 30/0222* (2013.01); *G06Q 20/02* (2013.01); *G06Q 20/3821* (2013.01); *G06Q 20/40* (2013.01)

(58) Field of Classification Search
CPC combination set(s) only.
See application file for complete search history.

(56) References Cited

U.S. PATENT DOCUMENTS 3,931,497 A * 1/1976 Gentile .................... B67D 7/14
235/381
5,613,012 A   3/1997 Hoffman
(Continued)

FOREIGN PATENT DOCUMENTS

EP    2156397 A1    2/2010
WO    0135304 A1    5/2001
(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
(Continued)

*Primary Examiner* — Matthew T Sittner
(74) *Attorney, Agent, or Firm* — Kilpatrick Townsend & Stockton LLP

(57) ABSTRACT

Processing of a transaction involving one or more third-parties and offers is described. Certain embodiments allow for suspending a received authorization request message which includes a transaction amount and a token mapped to a primary account number. One or more third-parties may be queried for an offer or discount eligible towards the transaction. The authorization request message may be adjusted to reflect one or more eligible offers from the one or more third-parties. The authorization request message may also be adjusted to replace the token with the mapped PAN. The authorization request message may then be sent to an issuer for further processing.

21 Claims, 11 Drawing Sheets

(51) Int. Cl.
  *G06Q 20/02* (2012.01)
  *G06Q 20/38* (2012.01)
  *G06Q 20/40* (2012.01)

(56) References Cited

U.S. PATENT DOCUMENTS

| | | |
|---|---|---|
| 5,781,438 A | 7/1998 | Lee |
| 5,883,810 A | 3/1999 | Franklin |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,423,457 B1 * | 4/2013 | Schattauer ............ G06Q 20/10 705/14.26 |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,533,860 B1 | 9/2013 | Grecia |
| 8,538,845 B2 | 9/2013 | Liberty |

(56) References Cited

U.S. PATENT DOCUMENTS

| | | |
|---|---|---|
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,655,775 B1 | 2/2014 | Howe |
| 8,656,180 B2 | 2/2014 | Shablygin |
| 8,751,391 B2 | 6/2014 | Freund |
| 8,762,263 B2 | 6/2014 | Gauthier et al. |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0078785 A1* | 4/2003 | Antonello .............. G06Q 30/02 705/14.36 |
| 2003/0079220 A1* | 4/2003 | Bruner ................ G06Q 20/387 725/23 |
| 2003/0130955 A1 | 7/2003 | Hawthorne |
| 2003/0149625 A1* | 8/2003 | Leonardi .............. G06Q 20/202 705/14.17 |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0083184 A1* | 4/2004 | Tsuei ..................... G06Q 10/08 705/74 |
| 2004/0093281 A1 | 5/2004 | Silverstein |
| 2004/0139008 A1 | 7/2004 | Mascavage, III |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0215536 A1* | 10/2004 | Deliwala ............... G06Q 10/10 705/34 |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0011044 A1* | 1/2007 | Hansen ................. G06Q 20/24 705/14.15 |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0226159 A1* | 9/2007 | Duan ....................... G06N 5/04 706/47 |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0154772 A1* | 6/2008 | Carlson ................. G06Q 20/04 705/44 |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157123 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0319353 A1* | 12/2009 | Palmeri ................. G06Q 20/20 705/14.17 |
| 2009/0327131 A1 | 12/2009 | Beenau |
| 2010/0008535 A1 | 1/2010 | Abulafia |
| 2010/0057611 A1* | 3/2010 | Antoo ................... G06Q 20/10 705/39 |
| 2010/0088237 A1 | 4/2010 | Wankmueller |
| 2010/0094755 A1 | 4/2010 | Kloster |
| 2010/0106644 A1 | 4/2010 | Annan |

(56) References Cited

U.S. PATENT DOCUMENTS

| | | |
|---|---|---|
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161404 A1* | 6/2010 | Taylor .................... G06Q 20/12 705/14.38 |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0274653 A1* | 10/2010 | Hammad ............. G06Q 20/202 705/14.25 |
| 2010/0291904 A1 | 11/2010 | Musfeldt |
| 2010/0299267 A1 | 11/2010 | Faith et al. |
| 2010/0299364 A1* | 11/2010 | Baldwin ............... G06F 17/279 707/797 |
| 2010/0306076 A1 | 12/2010 | Taveau |
| 2010/0312626 A1 | 12/2010 | Cervenka |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0137797 A1 | 6/2011 | Stals et al. |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078795 A1* | 3/2012 | Mann, III ............. G06Q 20/04 705/44 |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0101881 A1* | 4/2012 | Taylor .................... G06Q 20/12 705/14.13 |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143768 A1 | 6/2012 | Hammad et al. |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0191977 A1* | 7/2012 | Foster ................... H04L 9/3242 713/170 |
| 2012/0197801 A1* | 8/2012 | Jimenez ............... G06Q 20/206 705/44 |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2012/0330827 A1* | 12/2012 | Marshall ................ G06Q 20/10 705/39 |
| 2012/0330837 A1 | 12/2012 | Persaud et al. |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173367 A1* | 7/2013 | Beighley, Jr. ....... G06Q 30/0214 705/14.16 |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226684 A1* | 8/2013 | Hammad ............. G06Q 30/0222 705/14.23 |
| 2013/0226799 A1 | 8/2013 | Raj |

(56) References Cited

U.S. PATENT DOCUMENTS

| | | |
|---|---|---|
| 2013/0226813 A1 | 8/2013 | Voltz |
| 2013/0238499 A1* | 9/2013 | Hammad ........... G06Q 20/3227 705/44 |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0268333 A1 | 10/2013 | Ovick et al. |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332251 A1* | 12/2013 | Ioannidis ........... G06Q 20/3224 705/14.23 |
| 2013/0332344 A1 | 12/2013 | Weber |
| 2013/0339238 A1* | 12/2013 | Unland .............. G06Q 30/0617 705/44 |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0164254 A1* | 6/2014 | Dimmick ........... G06Q 20/3674 705/71 |
| 2014/0188586 A1* | 7/2014 | Carpenter .......... G06Q 30/0222 705/14.23 |
| 2014/0188725 A1 | 7/2014 | Reardon |
| 2014/0294701 A1 | 10/2014 | Dai et al. |
| 2014/0297390 A1* | 10/2014 | Grindel ................ G06Q 30/02 705/14.36 |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |

FOREIGN PATENT DOCUMENTS

| | | |
|---|---|---|
| WO | 0135304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

(56) References Cited

OTHER PUBLICATIONS

Gaddam et al., U.S. Appl. No. 62/053,736 (unpublished), Completing Transactions Without a User Payment Device filed Sep. 22, 2014.
Patterson, U.S. Appl. No. 62/054,346 (unpublished), Mirrored Token Vault filed Sep. 23, 2014.
Dimmick, U.S. Appl. No. 14/952,514 (unpublished), Systems Communications With Non-Sensitive Identifiers filed Nov. 25, 2015.
Dimmick, U.S. Appl. No. 14/952,444 (unpublished), Tokenization Request Via Access Device filed Nov. 25, 2015.
Prakash et al., U.S. Appl. No. 14/955,716 (unpublished), Provisioning Platform for Machine-to-Machine Devices filed Dec. 1, 2015.
Wong et al., U.S. Appl. No. 14/966,948 (unpublished), Automated Access Data Provisioning filed Dec. 11, 2015.
Stubbs et al., U.S. Appl. No. 62/103,522 (unpublished), Methods and Systems for Wallet Provider Provisioning filed Jan. 14, 2015.
McGuire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-the-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Non-final Office Action dated Dec. 23, 2014, U.S. Appl. No. 14/146,638 (12 pages).
Final Office Action dated Jul. 10, 2015, U.S. Appl. No. 14/146,638 (13 pages).
Non-final Office Action dated May 27, 2016, U.S. Appl. No. 14/146,638 (13 pages).
Final Office Action dated Nov. 10, 2016, U.S. Appl. No. 14/146,638 (33 pages).

\* cited by examiner

TOKENIZATION AND THIRD-PARTY INTERACTION

CROSS-REFERENCES TO RELATED APPLICATIONS

The present application is a non-provisional application of and claims priority to U.S. Provisional Application No. 61/751,412 titled "SYSTEM AND METHOD INCLUDING TOKENIZING AND THIRD PARTY INTERACTION" filed on Jan. 11, 2013 and U.S. Provisional Application No. 61/748,435 titled "MOBILE WALLET AND POS SYSTEM" filed on Jan. 2, 2013, the entire contents of which are herein incorporated by reference for all purposes.

The present application is also related to U.S. Non-Provisional application Ser. No. 14/146,638, entitled "THIRD PARTY SETTLEMENT" filed Jan. 2, 2014, the contents of which are herein incorporated by reference for all purposes.

BACKGROUND

A number of instances have occurred where a user initiates a transaction involving a payment account that is enrolled with a digital wallet provider, or another third-party. Often times, the digital wallet provider or third-party may have an offer or discount that is eligible for the transaction. The offer or discount may reduce the amount that is owed by the issuer bank, as some of the transaction amount is contributed by the digital wallet provider or third-party. However, current solutions simply provide a credit to the issuer for the amount of the offer or discount, after the issuer has already settled the full amount of the transaction. This implementation is inefficient because the issuer has to settle the full amount of the transaction, even if an offer or coupon from a third-party is eligible for the transaction.

Embodiments of the invention address this and other problems, both individually and collectively.

SUMMARY

Embodiments of the invention relate to systems and methods for incorporating tokenization and offers technology with a digital wallet. Embodiments of the present invention also relate to systems and methods for providing offers using mapping identifiers used during a transaction to third-party identifiers.

According to some embodiments, a user may initiate a financial transaction from his/her communication device or at an access device, such as a payment terminal. A merchant and/or acquirer associated with the transaction may transmit an authorization request message and a temporary credential to a payment processing network. The temporary credential may be associated with a primary account number of the user's payment device. The authorization request message and the temporary credential may be received by a server computer that is part of the payment processing network. The server computer may replace the temporary credential in the authorization request message with the user's primary account number associated with the temporary credential. Prior to transmission of the authorization request message to an issuer, the server computer may determine whether an eligible discount or offer is applicable to the transaction. The server computer may query one or more third-parties to determine whether an offer or discount exists. The server computer may use mapping identifiers to communicate with the third-parties according to their established communication protocol. The one or more third-parties may be digital wallet providers. If multiple offers or discounts are eligible for the transaction, the server computer may determine a best offer to apply to the transaction or may combine the offers. The server computer may also query a local database that includes predetermined offers or discounts. If one or more of the third-parties do not respond with an offer or discount within a predetermined time, the server computer may continue with the authorization process without incorporating the offer or discount. If one or more of the third-parties responds with an offer or discount, the server computer may replace the authorization amount in the authorization request message with a new amount taking into account the offer or discount. The server computer may then transmit the authorization request message including the new amount and the primary account number to an issuer for further processing. At the time of settlement, the issuer may settle for the new amount incorporating the discount, rather than the full transaction amount.

One embodiment of the invention is directed to a method for facilitating a transaction involving offers or discounts from one or more third-parties. The method includes receiving, at a server computer, via a first communication channel, an authorization request message comprising a temporary credential and a first amount. The method also includes replacing, via the server computer, the temporary credential with a primary account number associated with the temporary credential. The method further includes suspending, via the server computer, transmission of the authorization request message to an issuer for a predetermined time period. The method additionally includes determining, via the server computer, a discount associated with the transaction. The method further includes replacing, via the server computer, the first amount with a second amount, wherein the second amount is a function of the first amount and the discount. The method also includes transmitting, via the server computer, the authorization request message comprising the second amount and the primary account number to an issuer for further processing.

Another embodiment of the invention is directed to a server computer comprising a processor, and a computer readable medium coupled to the processor. The computer readable medium comprises code, executable by the processor, for implementing the above-described method.

These and other embodiments of the invention are described in further detail below.

DETAILED DESCRIPTION

Figure 1:
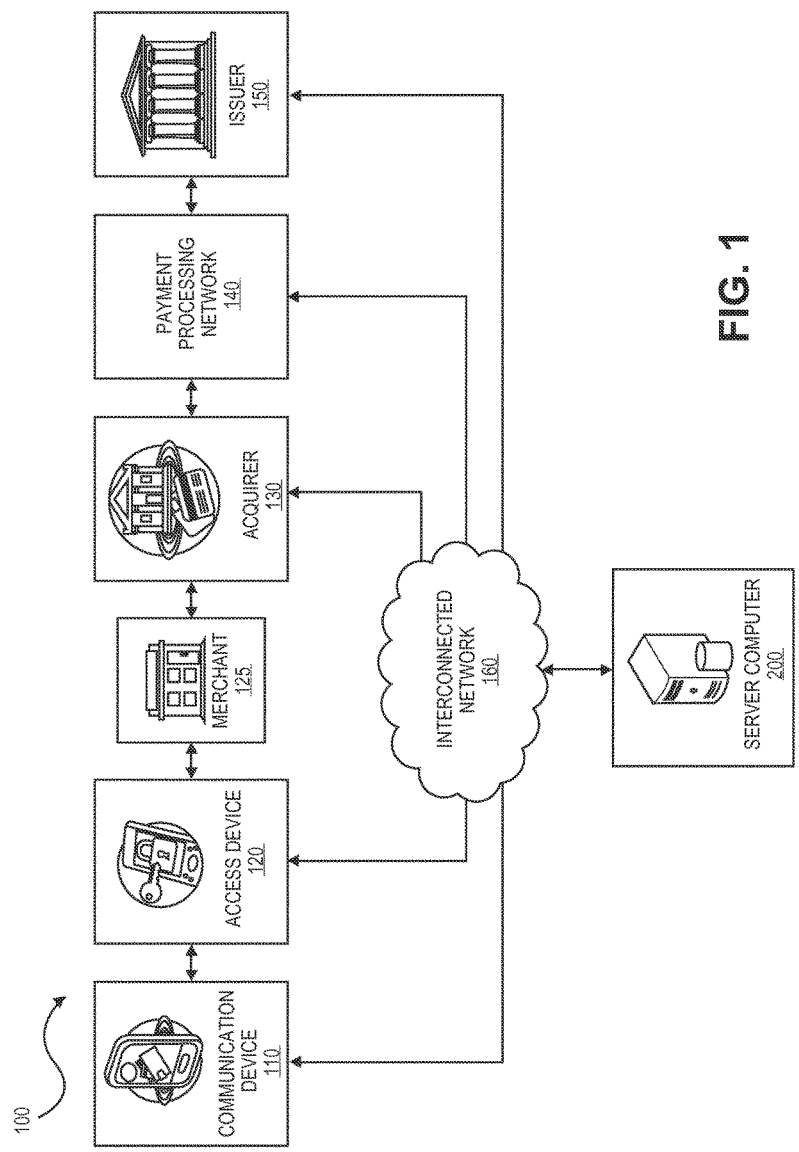
FIG. 1 is a block diagram of a payment system, according to an embodiment of the present invention.

Prior to discussing the specific embodiments of the invention, a further description of some terms can be provided for a better understanding of embodiments of the invention.

A "payment device" may include any suitable device capable of making a payment transaction. For example, a payment device can include a card such as a credit card, debit card, charge card, gift card, or any combination thereof. As another example, a payment device can be a communication device that is used to conduct a payment transaction.

A "payment processing network" (e.g., VisaNet™) may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments system) which processes authorization requests and a Base II system which performs clearing and settlement services.

A "server computer" can be a powerful computer or a cluster of computers. For example, the server computer can be a large mainframe, a minicomputer cluster, or a group of servers functioning as a unit. In one example, the server computer may be a database server coupled to a Web server.

An "access device" can be any suitable device configured to process payment transactions. For example, an access device (e.g., a point-of-sale (POS) terminal, etc.) can be used to process payment transactions such as credit card or debit card transactions, or electronic settlement transactions, and may have optical, electrical, or magnetic readers for reading data from other portable communication devices such as smart cards, keychain device, cell phones, payment cards, security cards, access cards, and the like.

An "acquirer" is a business entity (e.g., a commercial bank) that typically has a business relationship with a merchant. An acquirer may receive some or all of the transactions from that merchant.

An "issuer" is a business entity which issues a payment account that can be used to conduct transactions. Typically, an issuer is a financial institution.

An "account holder" is user who is authorized to conduct transactions with a payment account. The account holder can be, for example, the account owner of the account associated with a payment device, or an individual who is authorized to use the account on behalf of the account owner. The terms "account holder" and "user" may be used interchangeably in the following description.

A "communication device," as described herein, can be any electronic communication device that can execute and/or support electronic communications including, but not limited to, payment transactions. Some examples include a personal digital assistant (PDA), a smart phone, tablet computer, notebook computer, and the like.

An "authorization request message" may be an electronic message that is sent to request authorization for a transaction. An authorization request message can be sent, for example, to a payment processing network and/or an issuer of a payment device. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. An authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a issuer bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

As used herein, a "communications channel" may refer to any suitable path for communication between two or more entities. Suitable communications channels may be present directly between two entities such as a payment processing network and a merchant or issuer computer, or may include a number of different entities. Any suitable communications protocols may be used for generating a communications channel. A communication channel may in some instance comprise a "secure communication channel," which may be established in any known manner, including the use of mutual authentication and a session key and establishment of a secure socket layer (SSL) session. However, any method of creating a secure channel may be used. By establishing a secure channel, sensitive information related to a payment device (such as account numbers, CVV values, expiration dates, etc.) may be securely transmitted between the two or more entities to facilitate a transaction.

A "digital wallet provider" may include any suitable entity that provides a digital wallet service. A digital wallet provider may provide software applications that store account numbers, or representations of the account numbers (e.g., tokens), on behalf of an account holder to facilitate payments at more than one unrelated merchant, perform person-to-person payments, or load financial value into the digital wallet.

A "merchant of record" may include a merchant that has a relationship with the payment processing network. The merchant of record may receive the proceeds from a purchase when the purchase is settled. The merchant of record is the company that is ultimately responsible for the financial transaction.

A "payment service provider" may include an entity that contracts with an acquirer for the purpose of providing acceptance to a sponsored merchant, the sponsored merchant then contracts with a payment service provider to obtain payment services.

A "card on file transaction" may include a transaction that is conducted using a stored account identifier. A card on file transaction can include transactions initiated by merchants, payment service providers, and/or a digital wallet service provider using, for example, a payment account associated with a payment device.

A "token" may include a substitute for an account identifier such as a primary account number. Tokens are used in lieu of the primary account number and can be used to generate original and subsequent transactions for an entire transaction lifecycle. A token may be in a format that is similar to a primary account number. For example, if a real primary account number has 16 digits, then a corresponding payment token may also have 16 digits. In some, embodiments, a token may also be in a different format than a primary account number. A token may also be referred to as a "temporary credential."

An "offer" or a "discount" may include any incentive or reward from a third-party, such as a merchant, issuer, digital wallet provider, or payment service provider. The offer or discount may apply to a particular transaction based on the specifics of the transaction and/or the account being used in the transaction.

I. Exemplary Systems

Embodiments of the invention are directed to incorporating tokenization and offers technology with a third-party, e.g., a digital wallet provider.

A payment processing network, or server computer, can enable a new tokenization system that supports provisioning and processing of tokens, which may be utilized by the third-party. The tokens may be used from the point-of-sale (POS) through the transaction life-cycle, which can include clearing and exception processing.

The payment processing network can also incorporate offers or discounts by contacting the third party provider of the digital wallet technology. The payment processing network can incorporate payment processing technology. For example, the payment processing network may contact the third party provider in an authorization request message to facilitate the required data exchange and provide the third party provider with information the third party provider may need to provide offers.

Embodiments of the present invention may incorporate tokenization processing. For example, the token may be exchanged with the digital wallet when the consumer enrolls with the wallet. Thus, in some embodiments, an authentication process can be performed during the tokenization enrollment process prior to conducting a transaction to provide the digital wallet with the appropriate token before conducting a transaction. In some embodiments, the digital wallet can be provided with the token during a transaction, for example, if the digital wallet has not been previously provisioned with the token.

In some embodiments, when conducting a transaction using a token, an authorization request message can be generated with a wallet identifier or an authentication indicator to indicate an authentication process to authenticate the consumer has already taken place (e.g., authentication that took place during an enrollment process to provide the digital wallet with the token). In some embodiments, the wallet identifier or authentication indicator may be treated as a card present indicator. This may entitle the merchant to card present interchange rates, even though a physical payment card was not used in the transaction.

The token may comprise a one-to-one token to primary account number (PAN) relationship, or comprise a one-to-one token to digital wallet relationship. The token to primary account number mapping may be stored at the payment processing network, at the wallet provider, or elsewhere. For a token to wallet mapping, the storage may also include transaction rules. For example, for a fuel transaction, the consumer may want to use a payment account associated with the brand of fuel, or a grocery payment account associated with a grocery payment transaction. The transaction and payment account rules may be defined within one or more digital wallet providers for a particular consumer. In some embodiments, the token may be recognizable to a merchant as being associated with a particular routing location (e.g., pseudo primary account number (pseudo PAN) that starts with a particular digit or sequence of digits should be directed to a Visa® payment processing network).

Advantages of the one-to-one token to PAN relationship may help present correct product details at the POS device, apply correct interchange reimbursement fees (IRF) to the transaction, and incorporate existing near field communication models (e.g., magnetic-stripe data (MSD) and quick Visa Smart Debit/Credit (qVSDC)).

By incorporating the tokenization processing, the merchant and acquirer may conduct one or more of authorization, clearing, settlement, and/or exception processing using the token instead of the PAN. This may minimize the risk of fraud. In some embodiments, the token may be exchanged with the actual primary account number (PAN) during or prior to authorization, and subsequent processing after authorization may be conducted with the PAN. It should be understood that the token can be exchanged with the actual PAN in any of the financial messages that occur after the initial authorization request message including the token. For example, the token can be exchanged with the actual PAN by an entity forwarding the authorization request message, in an authorization response message, or in a clearing message such as a clearing request message, or in some embodiments, a clearing response message, etc.

The tokens can be issued using particular bank identification numbers (BINs), which can help identify account number ranges. The account number ranges can be distributed via routing tables, which may promote routing. The token provisioning model can be global and may support US domestic transactions. The Global model can have acquirer integration considerations.

A payment processing network (or server computer) may implement logic to suspend authorization request processing. During the suspended processing, the payment processing network can contact the third party provider to process an offer using the digital wallet. Data from the contact with the third party can be used to adjust the requested amount and be included in the response to the merchant. The rules for when to invoke contact with the third party can be based on the PAN and/or merchant.

In an embodiment, a timer can be used to terminate the contact with the third party and/or restart the suspended authorization request processing. For example, if a response from the third party is not received, the contact with the third party can be terminated upon the timer timing out. In some embodiments, the timer can be set to time out at a predetermined time period that does not overly disrupt the authorization processing.

The authorization response data can follow a POS redemption model to support the merchant environment. For example, established message formats can be used (e.g., F54 in which an additional amount can be defined and could help define the offer amount, F104 in which transaction-specific data can carry the offer code and receipt text, etc.). A merchant-funded model or third-party funding/settlement may be supported.

In an illustrative example an offer may be applied to a transaction by incorporating a digital wallet and PAN in a $100 transaction. The transaction may be initiated for $100 by an account holder, transmitted to the merchant, acquirer, and payment processing network. The payment processing network can contact the digital wallet, and the digital wallet can return a $5 coupon to associate with the transaction, so that the payment processing network can reduce the authorization request from $100 to $95. The transaction would later be cleared for the full $100. Thus, the authorization ($95) and clearing ($100) may be two different amounts. The $5 could come from a funding source (e.g., merchant, digital wallet, etc.).

Additionally, the coupons in the illustrative example may be stored or associated with an account holder on a digital wallet. The account holder may also choose to upload coupons within the digital wallet.

FIG. 1 is a block diagram of a payment system 100, according to one embodiment of the present invention. The system 100 includes a communication device 110, an access device 120, a merchant 125, an acquirer 130, a payment processing network 140, an issuer 150, and an interconnected network 160. The acquirer 130 may further include an acquirer computer (not shown). The payment processing network 140 may include an authorization and settlement server and/or additional servers (not shown) to carry out the various transactions described herein.

In an embodiment, a payment device such as communication device 110 is in electronic communication with the access device 120. The communication device 110 can be a personal digital assistant (PDA), a smart phone, tablet computer, notebook computer, or the like, that can execute and/or support payment transactions with a payment system 100. A communication device 110 can be used in conjunction with or in place of a payment card, such as a credit card, debit card, charge card, gift card, or other payment device and/or any combination thereof. A payment card (e.g., credit card), or the communication device 110 (e.g., smart phone), or the combination of the two can be referred to as the communication device 110 for ease of explanation. In other embodiments, the communication device 110 may be used in conjunction with transactions of currency or points (e.g., points accumulated in a particular software application). In further embodiments, the communication device 110 may be a wireless device, a contactless device, a magnetic device, or other type of payment device. In some embodiments, the communication device 110 includes software (e.g., application) and/or hardware to perform the various payment transactions.

The access device 120 is configured to be in electronic communication with the acquirer 130 via a merchant 125. In one embodiment, the access device 120 is a point-of-service (POS) device. Alternatively, the access device 120 can be any suitable device configured to process payment transactions such as credit card or debit card transactions, or electronic settlement transactions, and may have optical, electrical, or magnetic readers for reading data from portable electronic communication devices such as smart cards, keychain device, cell phones, payment cards, security cards, access cards, and the like. In some embodiments, the access device 120 is located at and controlled by a merchant. For example, the access device 120 can be a POS device at a grocery store checkout line. In other embodiments, the terminal could be a client computer or a mobile phone in the event that the user is conducting a remote transaction.

The acquirer 130 (e.g., acquirer bank) includes an acquirer computer (not shown). The acquirer computer can be configured to transfer data (e.g., bank identification number (BIN), etc.) and financial information to the payment processing network 140. In some embodiments, the acquirer 130 does not need to be present in the system 100 for the communication device 110 to transfer the financial and user data to the payment processing network 140. In one non-limiting example, the acquiring bank 130 can additionally check the credentials of the user against a watch list in order to prevent fraud and money laundering schemes, as would be appreciated by one of ordinary skill in the art.

In one embodiment, the payment processing network 140 is VisaNet™ where Visa internal processing (VIP) performs the various payment processing network 140 or multi-lateral switch functions described herein. The payment processing network 140 can include an authorization and settlement server (not shown). The authorization and settlement server ("authorization server") performs payment authorization functions. The authorization server is further configured to send and receive authorization data to the issuer 150. Furthermore, the payment processing network 140 can communicate with one or more third-parties to determine if an offer or discount is eligible for the transaction, as further described below.

In some embodiments, the issuer 150 is a business entity which issues a payment account that can be used to conduct transactions. Typically, an issuer is a financial institution. The issuer 150 is configured to receive the authorization data from the payment processing network 140 (e.g., the authorization server). The issuer 150 receives authentication data from the authorization server and determines if the user is authorized to perform a given financial transaction (e.g., cash deposit/withdrawal, money transfer, balance inquiry) based on whether the user was authenticated by an identification system.

In some embodiments, the communication device 110 may be connected to and communicate with the payment processing network 140 via an interconnected network 160. One example of an interconnected network 160 is the Internet. The payment processing network 140 may inform the communication device 110 when a payment has been successfully processed. In some embodiments, the payment processing network 140 may be connected to and communicate with the access device 120 via the interconnected network 160. The payment processing network 140 may inform the access device 120 when a payment has been successfully processed which in turn the access device 120 may complete the transaction with the communication device 110.

A server computer 200 is also shown in FIG. 1, and is in operative communication with the interconnected network 160. Details regarding the server computer 200 are provided below.

The interconnected network 160 may comprise one or more of a local area network, a wide area network, a metropolitan area network (MAN), an intranet, the Internet, a Public Land Mobile Network (PLMN), a telephone network, such as the Public Switched Telephone Network (PSTN) or a cellular telephone network (e.g., wireless Global System for Mobile Communications (GSM), wireless Code Division Multiple Access (CDMA), etc.), a VoIP network with mobile and/or fixed locations, a wireline network, or a combination of networks.

In a typical payment transaction in embodiments of the invention, a user may interact with the access device 120 (e.g., with a payment device such as a payment card or communications device, or by entering payment information) to conduct a transaction with the merchant 125. The merchant 125 may be operated by a merchant computer, which may route an authorization request message to the acquirer 130, and eventually to the issuer 150 via the payment processing network 140. In other embodiments, the user may simply interact with the communication device 110 to conduct a transaction with the merchant 125, e.g., online purchases.

The issuer 150 will then determine if the transaction is authorized (e.g., by checking for fraud and/or sufficient funds or credit). The issuer will then transmit an authorization response message to the access device 120 via the payment processing network 140 and the acquirer 130.

At the end of the day, the transaction is cleared and settled between the acquirer 130 and the issuer 150 by the payment processing network 140.

The description below provides descriptions of other components in the system as well as transactions involving third-parties. Interactions with the third-parties can be performed at any suitable point during the above-described transaction flow. For example, the payment processing network 140 may communicate with one or more third-parties to determine whether any offers or discounts are eligible towards the transaction.

Figure 2:
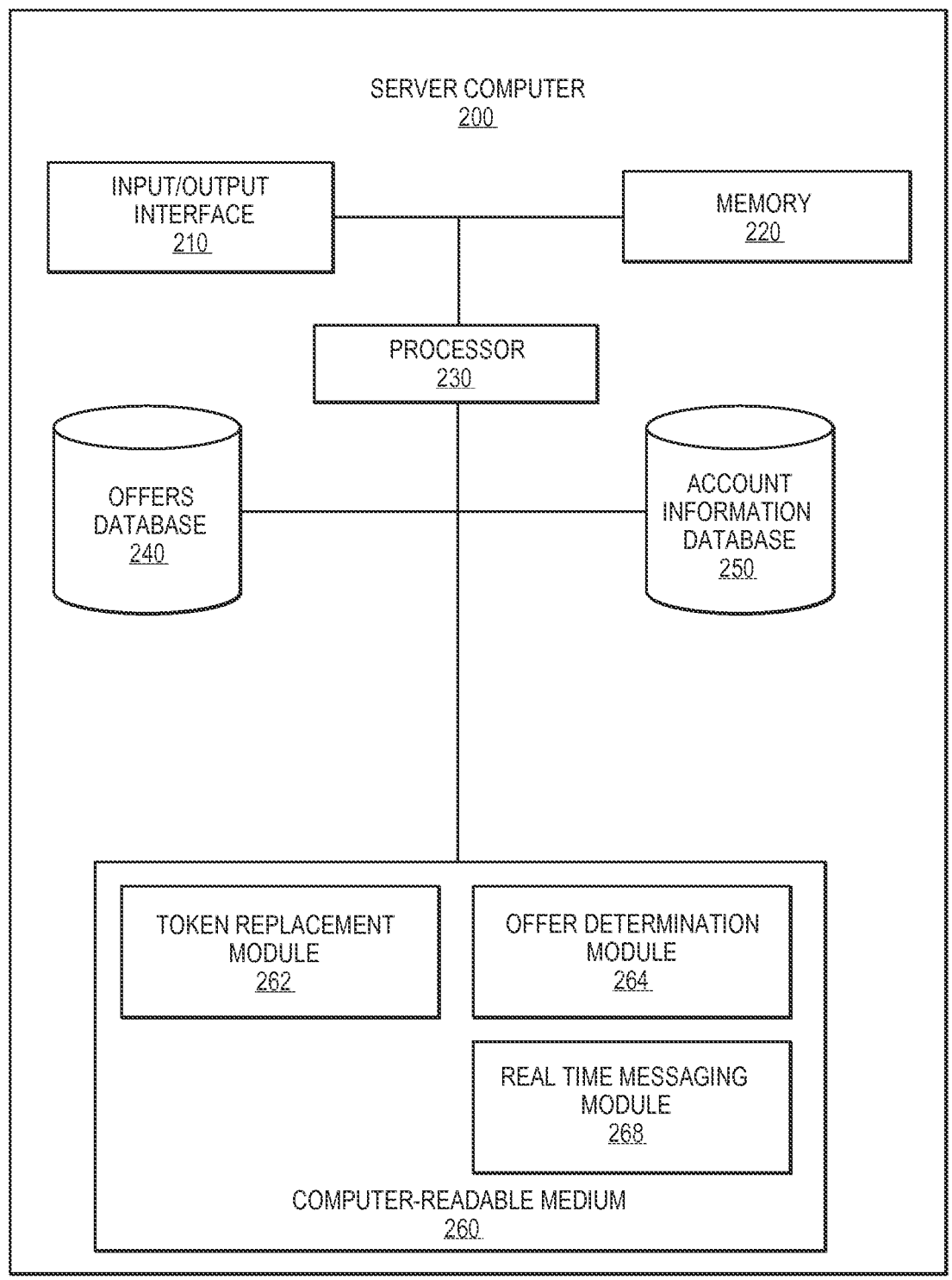
FIG. 2 is a block diagram of a server computer, according to an embodiment of the present invention.

FIG. 2 is a block diagram of a server computer 200, according to an embodiment of the present invention. Server computer 200 includes an input/output interface 210, a memory 220, a processor 230, an offers database 240, an account information database 250, and a computer-readable medium 260. In some embodiments, the server computer may reside within the interconnected network 160 (FIG. 1). In other embodiments, the server computer may reside within the payment processor network 140 (FIG. 1).

The input/output (I/O) interface 210 is configured to receive and transmit data. For example, the I/O interface 210 may receive an authorization request message from the acquirer 130 (FIG. 1). The I/O interface 210 may also communicate with one or more third-parties to obtain offer or discount information for a transaction. The I/O interface 210 may also be used for direct interaction with the server computer 200. The I/O interface 210 may accept input from an input device such as, but not limited to, a keyboard, keypad, or mouse. Further, the I/O interface 210 may display output on a display device.

Memory 220 may be any magnetic, electronic, or optical memory. It can be appreciated that memory 220 may include any number of memory modules, that may comprise any suitable volatile or non-volatile memory devices. An example of memory 220 may be dynamic random access memory (DRAM).

Processor 230 may be any general-purpose processor operable to carry out instructions on the server computer 200. The processor 230 is coupled to other units of the server computer 200 including input/output interface 210, memory 220, offers database 240, account information database 250, and computer-readable medium 260.

Offers database 240 is configured to store information about predetermined offers or discounts that may be applied to a transaction. The information about the offers or discounts may be stored within the offers database 240 prior to a transaction taking place. The server computer 200 may communicate, via I/O interface 210, with one or more third-parties to obtain the offer and discount information. This process may be done at predefined intervals or new information may be pushed to the server computer 200 by the third-parties. The information stored within the offers database 240 may be used to determine whether a particular offer or discount applies to a particular transaction currently being processed. For example, a third-party may be offering a $5 discount on all purchases of gas. The offers database 240 may contain this information.

The account information database 250 is configured to store information about payment accounts. This information can include personal information, e.g., name, age, birthdate, gender, etc. of the account owner or account holder. The information can also include the primary account number (PAN) associated with a user's payment device. The information stored in the account information database may be used, by the server computer 200, in conjunction with the offers database 240 when making a determination if an offer or discount is eligible for the transaction. The account information database 250 may also include information about tokens or temporary credentials associated with payment accounts.

Computer-readable medium 260 may be any magnetic, electronic, optical, or other computer-readable storage medium. Computer-readable storage medium 260 includes token replacement module 262, offer determination module 264, and real time messaging module 268. Computer-readable storage medium 260 may comprise any combination of volatile and/or non-volatile memory such as, for example, buffer memory, RAM, DRAM, ROM, flash, or any other suitable memory device, alone or in combination with other data storage devices.

Token replacement module 262 is configured to replace a token received within an authorization request message with a PAN. The token may have been received from the acquirer 130 (FIG. 1), the access device 120 (FIG. 1), or the communication device 110 (FIG. 1). Additionally, the token may be associated with one or more third-parties, e.g., a digital wallet provider associated with the user's payment account. Upon receiving the token, the token replacement module 262 may perform a lookup with the account information database 250 to determine a PAN associated with the received token. From the lookup, the server computer 200 may also determine which (if any) third party is associated with the token. After determining the PAN associated with the received token, the token replacement module 262 may replace the token in the received authorization request message with the PAN. The authorization request message may then be transmitted to an issuer 150 (FIG. 1) for further processing.

Offer determination module 264 is configured to determine whether an offer or discount is eligible to be applied to a transaction. Upon the server computer 200 receiving the authorization request message from the acquirer 130 (FIG. 1), the access device 120 (FIG. 1), or the communication device 110 (FIG. 1), the offer determination module 264 may suspend or delay the transmission of the authorization message to the issuer 150 (FIG. 1). The offer determination module 264 may then establish a communication channel, via I/O interface 210, with one or more third-parties to determine whether an eligible offer or discount exists. Information about the transaction obtained from the account information database 250 and from the received authorization request message may be transmitted to the third-party for this purpose. If the third-party determines that the transaction is eligible for an offer or discount, the third-party may provide an indication to the server computer 200. The offer determination module 264 may also set a predetermined timeout time period for the established communication between the server computer 200 and the one or more third-parties. If the one or more third-parties do not reply within the predetermined timeout time period, the offer determination module 264 may report that no offer or discount is eligible for the transaction, and may resume the transmission of the authorization request message to the issuer 150 (FIG. 1). In the event that the one or more third-parties reply with an eligible offer or discount applicable to the transaction (e.g., reply within the predetermined timeout time period), the offer determination module 264 may adjust the transaction amount in the authorization request message to incorporate the offer or discount prior to sending the authorization request message to the issuer 150 (FIG. 1) for further processing. The adjusted amount may be a function of the original transaction amount and the offer or discount.

Real-time messaging module 268 is configured to establish a communication with one or more third parties, as described above. The real-time messaging module 268 may communicate, via I/O interface 210 with various modules stored within a third-party, such as a digital wallet provider. The real-time messaging module 268 may communicate with each third-party using a data protocol that is employed by the particular third-party. For example, a first third-party may use a first communication protocol and a second third-party may use a second communication protocol. Further, the real-time messaging module 268 can determine which third-party to communicate with, as only some third-parties may be associated with the offers and discounts for a transaction using a particular account. The real-time messaging module 268 may make this determination by using universal identifier mapping with a merchant identifier or account number in the authorization request message received by the server computer 200. Further details of the real-time messaging module 268 are described with respect to FIG. 3B.

It can be appreciated that in some embodiments the server computer 200 may reside within the payment processing network 140 (FIG. 1).

II. Enrollment

Figure 3A:
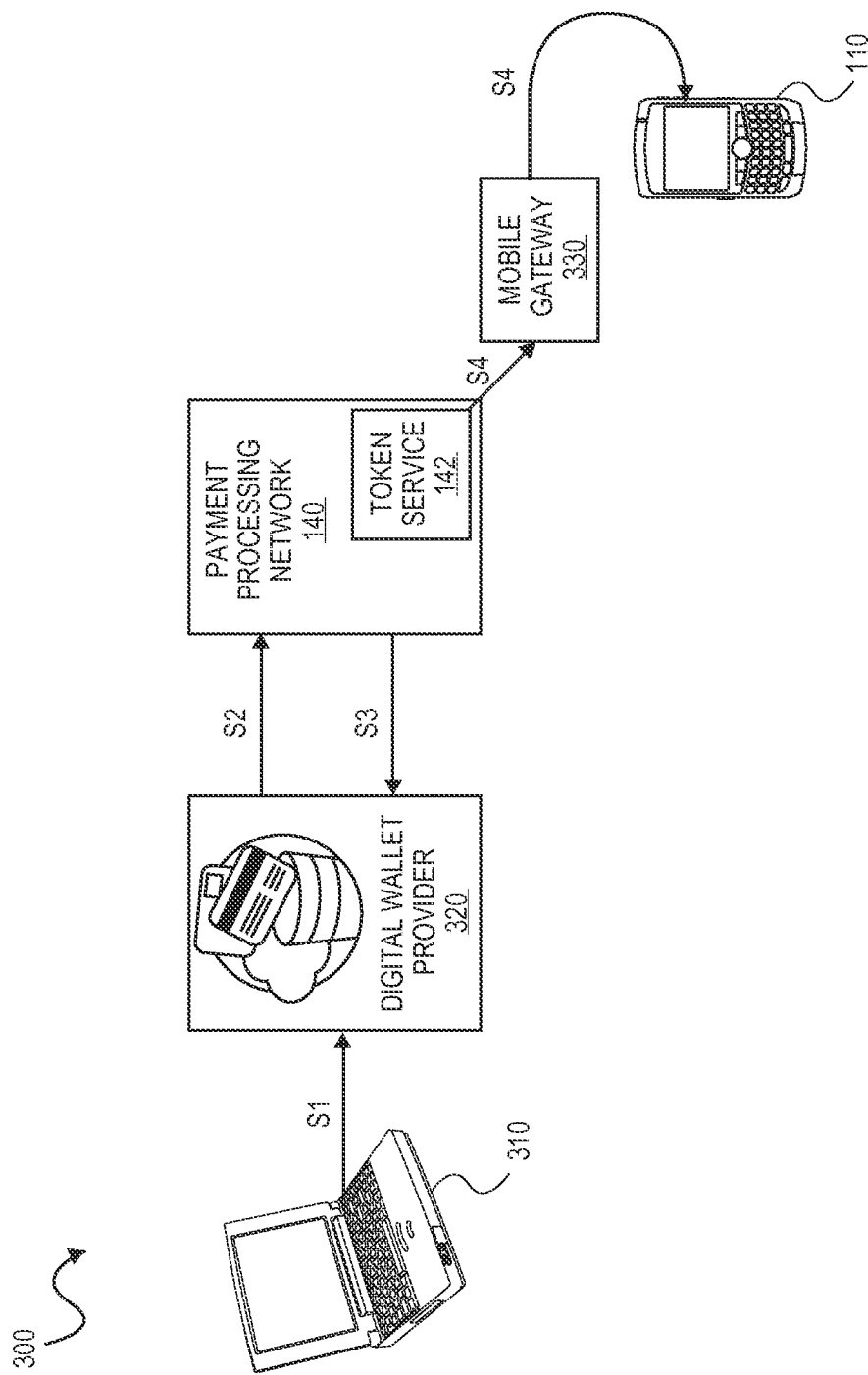
FIG. 3A is a block diagram of a system that conducts an enrollment process with a third-party, according to an embodiment of the present invention.

FIG. 3A is a block diagram of a system 300 that conducts an enrollment process with a third-party, according to an embodiment of the present invention. The system 300 can include computing device 310, digital wallet provider 320, payment processing network 140, mobile gateway 330, and communication device 110. It can be appreciated that while system 300 illustrates a digital wallet provider 320 as the third-party, any other third-party may alternatively or additionally reside within the system 300.

At step s1, a user may enroll his/her payment account having a PAN with a digital wallet provider 320. The enrollment may be performed using a computing device 310. The enrollment process may require certain information from the user, such as his/her personal information and information pertaining to the payment account that is being enrolled with the digital wallet provider 320 (e.g., card verification value, security code, etc.). Some examples of digital wallet providers include Google Wallet, PayPal, and V.me. The computing device 310 may communicate with the digital wallet provider 320 over a network, such as interconnected network 160 (FIG. 1).

At step s2, the digital wallet provider 320 may authenticate the primary account number associated with the payment account with a tokenization service 142. In some embodiments, the tokenization service may be a part of the payment processing network 140. The digital wallet provider 320 may transmit the enrollment information, including information about the user and information pertaining to the payment account details, to the tokenization service 142. The tokenization service 142 may authenticate and verify the received information. The tokenization service 142 may determine whether the user attempting to perform the enrollment with the digital wallet provider 320 is an authorized user of the payment account, and not a fraudster. The tokenization service 142 may deny the token request from the digital wallet provider 320 if it is determined that the user is not authorized to conduct transactions with the payment account.

At step s3, if the tokenization service 142 determines that the user is authorized to use the payment account, the tokenization service 142 may reply to the token request from the digital wallet provider 320 with a token. In some embodiments, the token may have a one-to-one token to PAN mapping. That is, the token may represent and be associated with, and only with, a single PAN. Upon receiving the token, the digital wallet provider 320 may load the token into the user's "digital wallet" and permanently associate the token with the payment account. The "digital wallet" may be a created wallet account for the user that stores payment account data for use during a payment transaction. For example, the digital wallet software may also validate whether a wallet owner has permission to load each payment account, using the steps described above. In some embodiments, the digital wallet provider 320 may transmit token account data back to the communication device 110.

At step s4, the tokenization service 142 may provision a user's communication device with the token (e.g., by sending a message with the token to the consumer's communication device 110) via a mobile gateway 330. The communication device 110 may locally store the received token in a client software application related to the digital wallet provider 320. For a future transaction, the communication device 110 may execute the software application related to the digital wallet provider 320 and communicate with the digital wallet provider 320.

III. Facilitating a Transaction Involving Third-Party

Figure 3B:
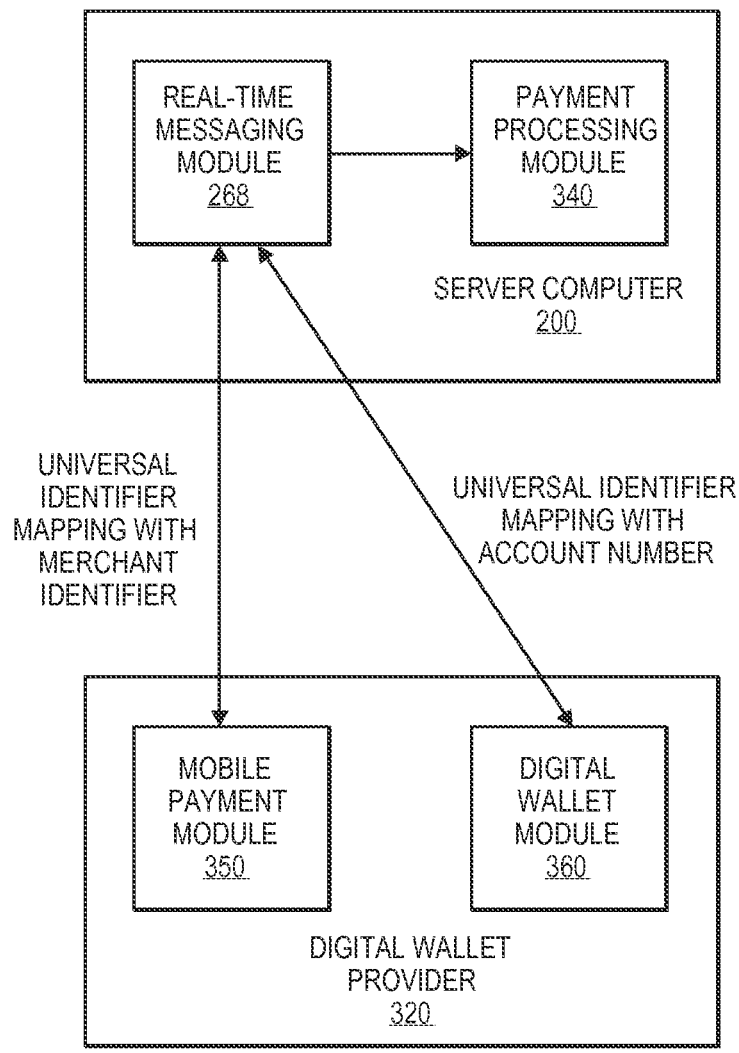
FIG. 3B is a block diagram illustrating universal identifier mapping with a third-party, according to an embodiment of the present invention.

FIG. 3B is a block diagram illustrating universal identifier mapping with a third-party, according to an embodiment of the present invention. In an example, the third-party may be the digital wallet provider 320. The server computer 200 may be associated with a payment processing network, and may include the real-time messaging module 268, as described above. Additionally, the server computer 200 may include a payment processing module 340. The digital wallet provider 320 may include one or more modules, including mobile payment module 350 and digital wallet module 360. As described above, the real-time messaging module 268 may facilitate communication between the server computer 200 and the digital wallet provider 320 using a communication protocol employed by the digital wallet provider 320. The digital wallet provider 320 may also incorporate one or more standardized data fields in any communications with the real-time messaging module 268.

For example, the mobile payment module 350 may transmit merchant information, including a merchant identifier to the server computer 200. In some embodiments, digital wallet provider 320 may use a different classification or identification system for merchant identifiers than server computer 200. In such embodiments, the merchant identifier may be mapped to a universal identifier and provided to the server computer 200 in a file (e.g., one-time file, periodic file, etc.) to enable the server computer to correlate the merchant identifier received from digital wallet provider 320 to the classification or identification system used by server computer 200. The server computer 200 may receive the file via the real-time messaging module 268. The digital wallet provider 320 may also transmit PANs to the server computer 200. The PANs may be transmitted via a web service in a particular format (e.g., a format associated with the real-time messaging module 268) and mapped to a universal identifier. In some embodiments, server computer 200 may use a different classification or identification system for account numbers than digital wallet provider 320, and the universal identifier can be used to enable digital wallet provider 320 to correlate the PAN received from server computer 200 to the classification or identification system used by digital wallet provider 320. The server computer 200 may receive this information via the real-time messaging module 268. In an embodiment, the transmission can bypass other systems (e.g., an address verification service, membership identification checks, etc.), or restrict account holders by type (e.g., issuer associated with the account, account type, etc.).

The real-time messaging module 268 can transmit information to a payment processing module 340 at the server computer 200. For example, the merchant information can be sent to the payment processing module 340 (e.g., as a new segment). Individual account holder updates can be sent to the payment processing module as well.

In another example, an authorization request message may be transmitted from the payment processing module 340 to the digital wallet provider 320, via the real-time messaging module 268. During the processing of an authorization request, the server computer 200 may transmit limited information to the digital wallet provider 320. In an embodiment, the enrolled cardholder may trigger an offer request and information from a merchant central file service (MCFS), account holder database, or other source of information that can be used to map to a universal identifier.

In some embodiments, if a transaction is adjusted to reflect an offer or discount, the payment processing module 340 may communicate adjustment information to the real-time messaging module 268. This may be used to store the adjustment information, which be retrieved during settlement. For example, the real-time messaging module 268 can use the information in a reconciliation with a clearing draft.

Figure 4:
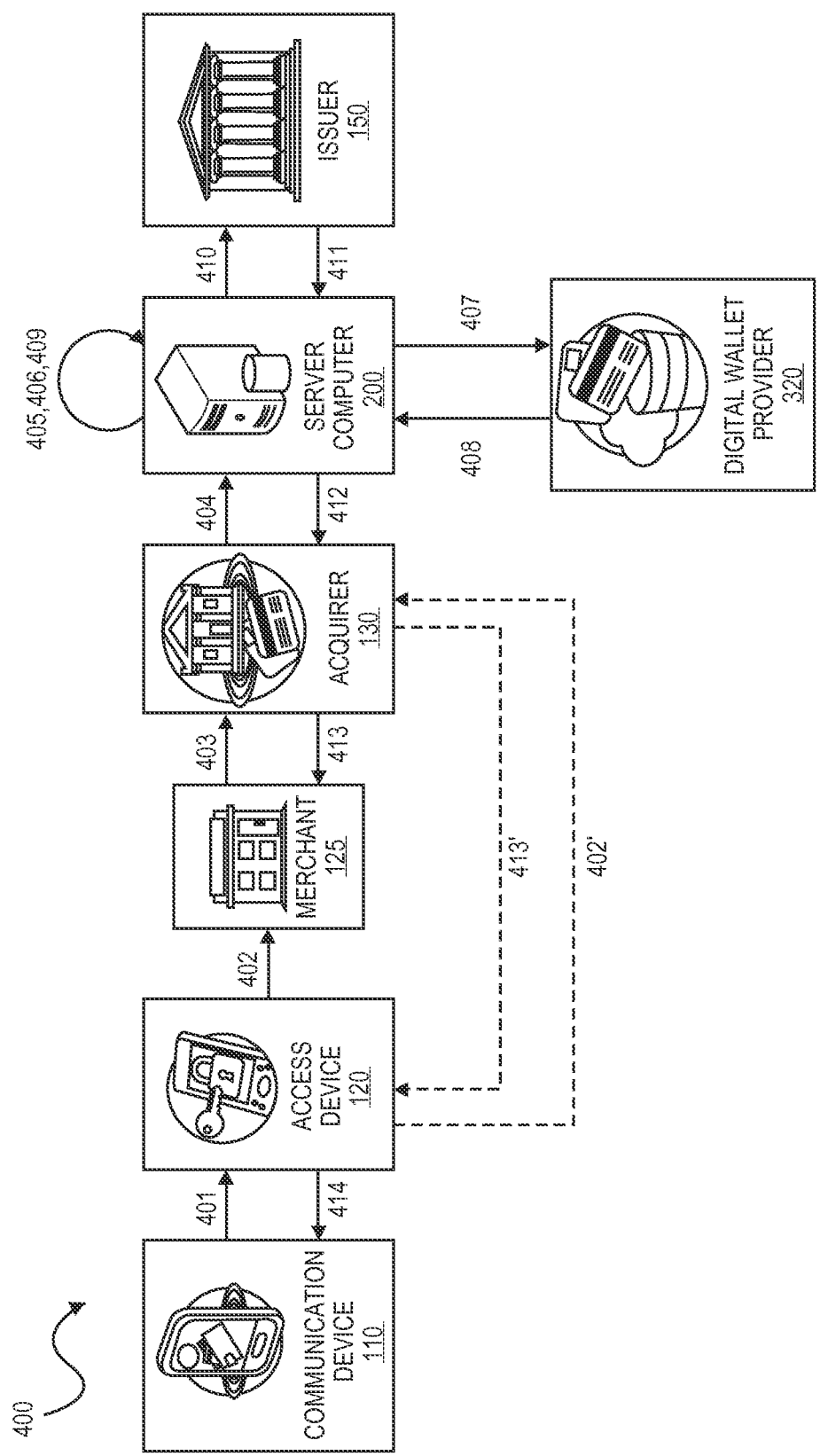
FIG. 4 is a flow diagram illustrating a system for facilitating a transaction involving a third-party, according to an embodiment of the present invention.

FIG. 4 is a flow diagram illustrating a system 400 for facilitating a transaction involving a third-party, according to an embodiment of the present invention. The system 400 can include communication device 110, access device 120, merchant 125, acquirer 130, server computer 200, issuer 150, and digital wallet provider 320. In some embodiments, server computer 200 may reside within payment process network 140 (FIG. 1). The third-party in this example may be the digital wallet provider 320.

At step 401, a consumer (e.g., a user or account holder) may initiate a payment transaction using a communication device 110 or other payment device to interface with an access device 120 at a merchant 125. The communication device 110 may interface with the access device 120 using, for example, near-field communication (NFC). For example, the consumer may use the communication device 110 to initiate the payment transaction by waving the communication device 110 by the access device 120. The communication device 110 and the access device 120 may also interact using a contactless mode of operation (e.g., RF transmission). The communication device 110 may contain a token or other temporary credential associated with a payment account, and device data to initiate the payment transaction.

At step 402, the merchant 125 may receive the device data, token, and other pertinent transaction information from the access device 120. For example, when the communication device 110 is waved at the access device 120, the merchant 125 can receive the device data, token, and other pertinent transaction information from the access device 120.

At step 403, the merchant 125 may initiate an authorization request to the acquirer 130. The authorization request may include transmitting an authorization request message from the merchant 125 to the acquirer 130. The acquirer 130 may be an acquirer bank associated with the merchant 125. The authorization request message may include the token and an original transaction amount. In some embodiments, the access device 120 may directly send the authorization request message to the acquirer 130 (step 402').

At step 404, the server computer 200 may receive the authorization request message with the token and the original transaction amount from the acquirer 130. The server computer 200 may be requested, by the acquirer 130, to authenticate the token data.

At step 405, upon authenticating the token data, the server computer 200 may exchange the token for a PAN in the authorization request message. The server computer 200 may query the account information database 250 (FIG. 2) in order to determine the PAN associated with the received token. Once the PAN is determined, the server computer 200 may replace the token data in the authorization request message with data representing the PAN.

At step 406, the server computer 200 may suspend or delay or "hold" transmission of the authorization request message to the issuer 150. The suspending or holding of the transmission may be for a predetermined period of time. For example, the server computer 200 may suspend the transmission for 200 milliseconds (ms) in order to determine whether the transaction is eligible for an offer, as described below. In some embodiments, other durations of suspension time that does not significantly impact the transaction processing speed can be used (e.g., 100 ms, 300 ms, 400 ms, 500 ms, etc.). Suspending the transaction only for a predetermined period of time is beneficial because the server computer 200 may resume processing of the authorization request when a determination regarding an offer or discount cannot be made within the predetermined period of time.

This prevents unnecessary delay of the authorization processing. In some embodiments, server computer 200 may suspend the transmission of the authorization request message until a determination is made as to whether the transaction is eligible for an offer, or until the predetermined period of time has elapsed, whichever occurs first.

At step 407, the server computer 200 may identify whether the merchant 125 and/or the PAN participate in an offer service associated with the digital wallet provider 320. The server computer 200 may determine the appropriate digital wallet provider 320 using the techniques described with respect to FIG. 3B. The server computer 200 may establish a communication, via a communication channel, to the digital wallet provider 320. The communication channel may be part of a private or public network (e.g., the Internet). The server computer 200 may request the digital wallet provider 320 to provide an eligible offer or discount associated with the transaction, or indicate that no such offer or discount is eligible. The eligibility of the offer or discount may be based on specifics of the transaction, such as the payment account being used, the merchant 125, the acquirer 130, the type of good or service involved in the transaction, etc. For example, the digital wallet provider 320 may have an offer for a $5 discount on any $100 or more purchase at electronics retailer. The server computer 200 may forward relevant data to the digital wallet provider 320 in order to make the offer determination. The offer or discount can be a fixed dollar amount, a percentage, a variable dollar amount, or other type of function to offset the transaction amount (e.g., graduated discount amounts based on transaction amount, etc.).

At step 408, the server computer 200 may receive an indication that an offer or discount is eligible for the transaction from the digital wallet provider 320. In other cases, the server computer 200 may receive an indication that no offer or discount is eligible for the transaction. Using the example above, the server computer 200 may receive an indication from the digital wallet provider 320 that a $5 discount is eligible for the transaction because the transaction total is $100 and the merchant 125 is an electronics retailer. If the server computer 200 does not receive any offer indication from the digital wallet provider 320 within the predetermined period of time, the server computer 200 may continue with the authorization request processing using the original transaction amount in the authorization request message. In some embodiments, server computer 200 may suspend the transmission of the authorization request message until the digital wallet provider 320 responds or until the predetermined period of time has elapsed, whichever occurs first. In some embodiments, server computer 200 may suspend the transmission of the authorization request message for the predetermined period of time regardless of whether the digital wallet provider 320 responds.

At step 409, the server computer 200 adjusts the amount in the authorization request message to reflect the determined offer or discount. For example, the server computer 200 may adjust the original transaction amount by $5 based on the discount information received from the digital wallet provider 320. That is, the server computer 200 may adjust the authorization request message to include $95 as the transaction amount, instead of the $100 original transaction amount.

At step 410, the server computer 200 may transmit the adjusted authorization request message to the issuer 150. Information in the authorization request message that is transmitted to the issuer 150 may be different than the information that is transmitted to the digital wallet. For example, if the authorization request includes information about the offer, that information may be removed before submitting the authorization request message to the issuer. The authorization request message may also include the PAN, which the server computer 200 translated from the token in step 405. The issuer may determine whether to approve or deny the transaction based on data received in the authorization request message and using a variety of techniques well known in the art, e.g., risk analysis.

At step 411, the server computer 200 may receive an authorization response message from the issuer 150. The authorization response may indicate to the server computer 200 that the issuer 150 has either approved or denied the adjusted transaction amount (e.g., $95).

At step 412, the server computer 200 may transmit the authorization response message to the acquirer 130. The authorization response message may indicate offer details and that a portion of the original transaction amount is being provided by a third-party, e.g., the digital wallet provider 320. The acquirer 130 may forward the authorization response message to the merchant 125 (step 413) or directly to the access device 120 (step 413'). An alert indicating that the transaction was approved, along with offer details, may be transmitted to the communication device 110 (step 414). The access device 120 may also display approval information regarding the transaction and offer details. In some embodiments, prior to transmitting the authorization response message to the acquirer 130, the server computer 200 may replace the PAN with the original token. This method is beneficial because the PAN can be sent only between the server computer 200 and the issuer 150, while all other communications within the system 400 use the token, thereby reducing the risk of a fraudster obtaining sensitive data. In some embodiments, only the last 4 digits of PAN may be transmitted within the authorization response message to the acquirer 130, such that the merchant 125 can provide receipt information to the access device 120 and/or communication device 110.

At the time of settlement and clearing, the acquirer 130 may clear the transaction for the full amount (e.g., $100) and the issuer 150 may settle the transaction for the adjusted transaction amount (e.g., $95) while the digital wallet provider 320 may settle for the offer or discount amount (e.g., $5). The account holder's payment account statement from the issuer 150 may only show the adjusted transaction amount (e.g., $95). In other embodiments, the discount may be applied in the form of a statement credit. That is, the account holder's statement from the issuer 150 may show the full transaction amount and the offer or discount amount as two different line items. For example, the full transaction amount may be listed as one day of the account statement and the discount may be listed as the next day, or both amounts may be listed on the same day. There may be some descriptor of the credit amount provided. The digital wallet provider 320 may retain the adjustment decisioning and related account holder communication. In an embodiment, the adjustment decisioning may include processing related to the discounts and offers.

In an illustrative example, the account holder may initiate a payment transaction for $100 with a $5 discount offered by the digital wallet provider 320. The $100 may flow between the issuer 150 and the acquirer 130 via server computer 200. The issuer 150 may receive the $5 amount associated with the discount from the digital wallet provider 320. In the case where the offer or discount was offered by the merchant 125, the digital wallet provider 320 may collect the $5 from the merchant 125. As such, the cardholder's account statement from the issuer 150 may show the full transaction amount (e.g., $100) and a statement credit, rather than only the adjusted transaction amount (e.g., $95) as shown in the example above.

During settlement processing, a clearing message may be received by the server computer 200, from the acquirer 130, for the full transaction amount. The clearing message with the full transaction amount may be transmitted, by the server computer 200 or the issuer 150. For example, the message may contain the information received during the authorization to reconcile against the clearing draft. Cleared records can be compared against outstanding applied adjustments (e.g., by matching a transaction identifier). The real-time messaging module 268 can compare the transaction identifiers of stored adjustments with transaction identifiers contained in the cleared messages. Other data fees may remain unchanged. The real-time messaging module 268 can then transmit a settlement message to the digital wallet provider 320. The digital wallet provider 320 may implement the offers during authorization. The settlement message may be related to the account holder and merchant, and associated with a universal identifier at the digital wallet provider 320. The digital wallet provider 320 can alert the account holder (e.g., cardholder). The real-time messaging module 268 can initiate additional messages (e.g., TC06) for an account holder statement credit. The additional messages may be sent through statement credit module to an acquirer 130 and/or issuer 150. In an embodiment, the digital wallet provider 320 may only receive settlement records that match applied discounts. Other messages may be transmitted to send settlement messages for all clearing records for participating account holders.

Figure 5:
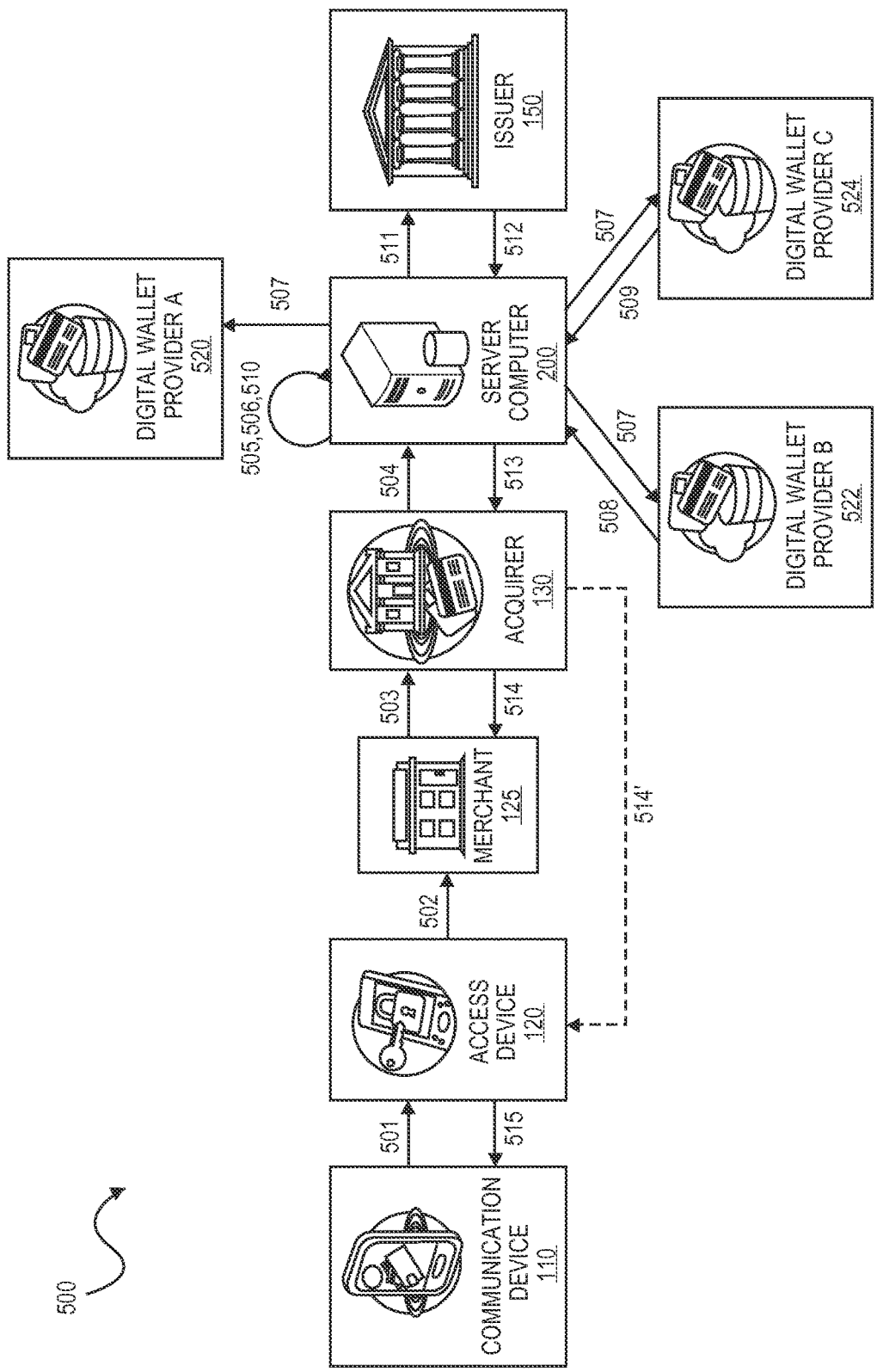
FIG. 5 is a flow diagram illustrating a system for facilitating a transaction involving more than one third-party, according to an embodiment of the present invention.

FIG. 5 is a flow diagram illustrating a system 500 for facilitating a transaction involving more than one third-party, according to an embodiment of the present invention. The system 500 includes communication device 110, access device 120, merchant 125, acquirer 130, server computer 200, issuer 150, and a plurality of digital wallet providers: digital wallet provider A 520, digital wallet provider B 522, and digital wallet provider C 524. In some embodiments, server computer 200 may reside within payment process network 140 (FIG. 1).

At step 501, a consumer (e.g., a user or account holder) may initiate a payment transaction using a communication device 110 or other payment device to interface with an access device 120 at a merchant 125. The communication device 110 may interface with the access device 120 using, for example, near-field communication (NFC). For example, the consumer may use the communication device 110 to initiate the payment transaction by waving the communication device 110 by the access device 120. The communication device 110 and the access device 120 may also interact using a contactless mode of operation (e.g., RF transmission). The communication device 110 may contain a token or other temporary credential associated with a payment account, and device data to initiate the payment transaction.

At step 502, the merchant 125 may receive the device data, token, and other pertinent transaction information from the access device 120. For example, when the communication device 110 is waved at the access device 120, the merchant 125 can receive the device data, token, and other pertinent transaction information from the access device 120.

At step 503, the merchant 125 may initiate an authorization request to the acquirer 130. The authorization request may include transmitting an authorization request message from the merchant 125 to the acquirer 130. The acquirer 130 may be an acquirer bank associated with the merchant 125. The authorization request message may include the token and an original transaction amount. In some embodiments, the access device 120 may directly send the authorization request message to the acquirer 130.

At step 504, the server computer 200 may receive the authorization request message with the token and the original transaction amount from the acquirer 130. The server computer 200 may be requested, by the acquirer 130, to authenticate the token data.

At step 505, upon authenticating the token data, the server computer 200 may exchange the token for a PAN in the authorization request message. The server computer 200 may query the account information database 250 (FIG. 2) in order to determine the PAN associated with the received token. Once the PAN is determined, the server computer 200 may replace the token data in the authorization request message with data representing the PAN.

At step 506, the server computer 200 may suspend or delay or "hold" transmission of the authorization request message to the issuer 150. The suspending or holding of the transmission may be for a predetermined period of time. For example, the server computer 200 may suspend the transmission for 200 ms in order to determine whether the transaction is eligible for an offer, as described below. In some embodiments, other durations of suspension time (e.g., 100 ms, 300 ms, 400 ms, 500 ms, etc.) may be used. Suspending the transaction only for a predetermined period of time is beneficial because the server computer 200 may resume processing of the authorization request a determination regarding an offer or discount cannot be made within the predetermined period of time. This prevents unnecessary delay of the authorization processing.

At step 507, the server computer 200 may identify whether the merchant 125 and/or the PAN participate in an offer service associated with one or more of the digital wallet providers. The server computer 200 may determine which of the digital wallet providers are applicable to the transaction, using the techniques described with respect to FIG. 3B. In some embodiments, more than one digital wallet provider may be associated with the transaction. For example, the payment account may be enrolled with digital wallet provider A 520, digital wallet provider B 522, and digital wallet provider C 524. The server computer 200 may establish communications, via one or more communication channels, to the digital wallet providers. For example, the server computer 200 may establish an individual communication channel with each of the digital wallet providers. The communication channels may be part of a private or public network (e.g., the Internet).

At step 508, the server computer 200 may receive an indication that the transaction is eligible for an offer or discount from one or more the digital wallet providers. In other cases, the server computer 200 may receive an indication that no offer or discount is available. For example, the server computer 200 may receive an indication from digital wallet provider A 520 that a $5 discount is eligible for the transaction and from digital wallet provider B 522 that a $10 discount is eligible for the transaction. If the server computer 200 does not receive any offer indication from the digital wallet providers within the predetermined period of time, the server computer 200 may continue with the authorization request processing using the original transaction amount in the authorization request message. If the server computer 200 receives an offer indication from only some of the digital wallet providers within the predetermined period of time, the server computer 200 may continue with the authorization request processing using offer data from only the digital wallet providers that responded within the appropriate time.

The server computer 200 may request the digital wallet providers to provide an eligible offer or discount associated with the transaction, or indicate that no such offer or discount is available. For example, the server computer 200 may request an eligible offer or discount from digital wallet provider A 520, digital wallet provider B 522, and digital wallet provider C 524. The eligibility of the offer or discount may be based on specifics of the transaction, such as the payment account being used, the merchant 125, the acquirer 130, the type of good or service involved in the transaction, etc. The server computer 200 may forward relevant data to each of the digital wallet providers in order to make the offer determination. The offer or discount can be a fixed dollar amount, a percentage, a variable dollar amount, or other type of function to offset the transaction amount.

Each of the digital wallet providers may provide a different offer or discount, or may not provide any offer or discount. For example, digital wallet provider A 520 may offer a $5 discount, digital wallet provider B may offer a $10 discount, and digital wallet provider C may offer no discount. In some embodiments, the server computer 200 may determine which is the best offer for the transaction. Often times, this may be the offer with the highest discount. However, it can be appreciated that this determination does not solely rely on the amount of the discount. For example, an offer of a lower amount may be offer better incentives (e.g., rewards points) than an offer of a higher amount. Some offers may be exclusive offers which may not be combined with any other offer or incentive. The server computer 200 may determine which of the offers is the best for the transaction.

In some embodiments, if the offers are not exclusive and are combinable, the server computer 200 may combine more than one offer. For example, if digital wallet provider A 520 offers a non-exclusive $5 discount and digital wallet provider B offers a non-exclusive $10 discount, the server computer 200 may combine both the offers in the form a $15 discount. At the time of settlement, the server computer 200 may obtain $5 from digital wallet provider A 520, $10 from digital wallet provider B, and the balance from the issuer 150. In some embodiments, the server computer 200 may determine whether a combination discounts results in a better offer for the cardholder than an exclusive offer. For example, digital wallet provider A 520 may offer a non-exclusive $5 discount, digital wallet provider B may offer a non-exclusive $10 discount, and digital wallet provider C may offer an exclusive $13 discount. In this case, the server computer may determine that the combination ($15) of the two non-exclusive offers from digital wallet provider A 520 and digital wallet provider B 522 may result in a better offer than the exclusive ($13) offer from digital wallet provider C 524. In some embodiments, the server computer 200 may also determine which offer is the "best" from the viewpoint of the merchant 125, issuer 150, or payment processor network.

It can be appreciated that the different digital wallet providers may provide the offer information to the server computer 200. For example, digital wallet provider B 522 may provide (step 508) relevant offer information to the server computer 200 after 100 ms from receiving the request and digital wallet provider C 524 may provide (step 509) relevant offer information to the server computer 200 after 150 ms from receiving the request. Hence, in some embodiments, the suspension of the authorization request message may last for the entirely of the predetermined time period even if an indication of an eligible offer is received before the predetermined time period expires to allow other entities to respond with additional offers.

At step 510, the server computer 200 adjusts the amount in the authorization request message to reflect the determined offer or discount, whether it be a combined offer or individual offer. For example, the server computer 200 may adjust the original transaction amount by $15 based on the combined discount information received from digital wallet provider A 520 and digital wallet provider B 522. That is, the server computer 200 may adjust the authorization request message to include $85 as the transaction amount, instead of the $100 original transaction amount.

At step 511, the server computer 200 may transmit the adjusted authorization request message to the issuer 150. Information in the authorization request message that is transmitted to the issuer 150 may be different than the information that is transmitted to the digital wallet. For example, if the authorization request includes information about the offer, that information may be removed before submitting the authorization request message to the issuer. The authorization request message may also include the PAN, which the server computer 200 translated from the token in step 405. The issuer may determine whether to approve or deny the transaction based on data received in the authorization request message and using a variety of techniques well known in the art, e.g., risk analysis.

At step 512, the server computer 200 may receive an authorization response message from the issuer 150. The authorization response may indicate to the server computer 200 that the issuer 150 has either approved or denied the adjusted transaction amount (e.g., $85).

At step 513, the server computer 200 may transmit the authorization response message to the acquirer 130. The authorization response message may indicate offer details and that a portion of the original transaction amount is being provided by one or more third-parties, e.g., digital wallet provider A 520 and digital wallet provider B 522. The acquirer 130 may forward the authorization response message to the merchant 125 (step 514) or directly to the access device 120 (step 514'). An alert indicating that the transaction was approved, along with offer details, may be transmitted to the communication device 110 (step 515).

Figure 6:
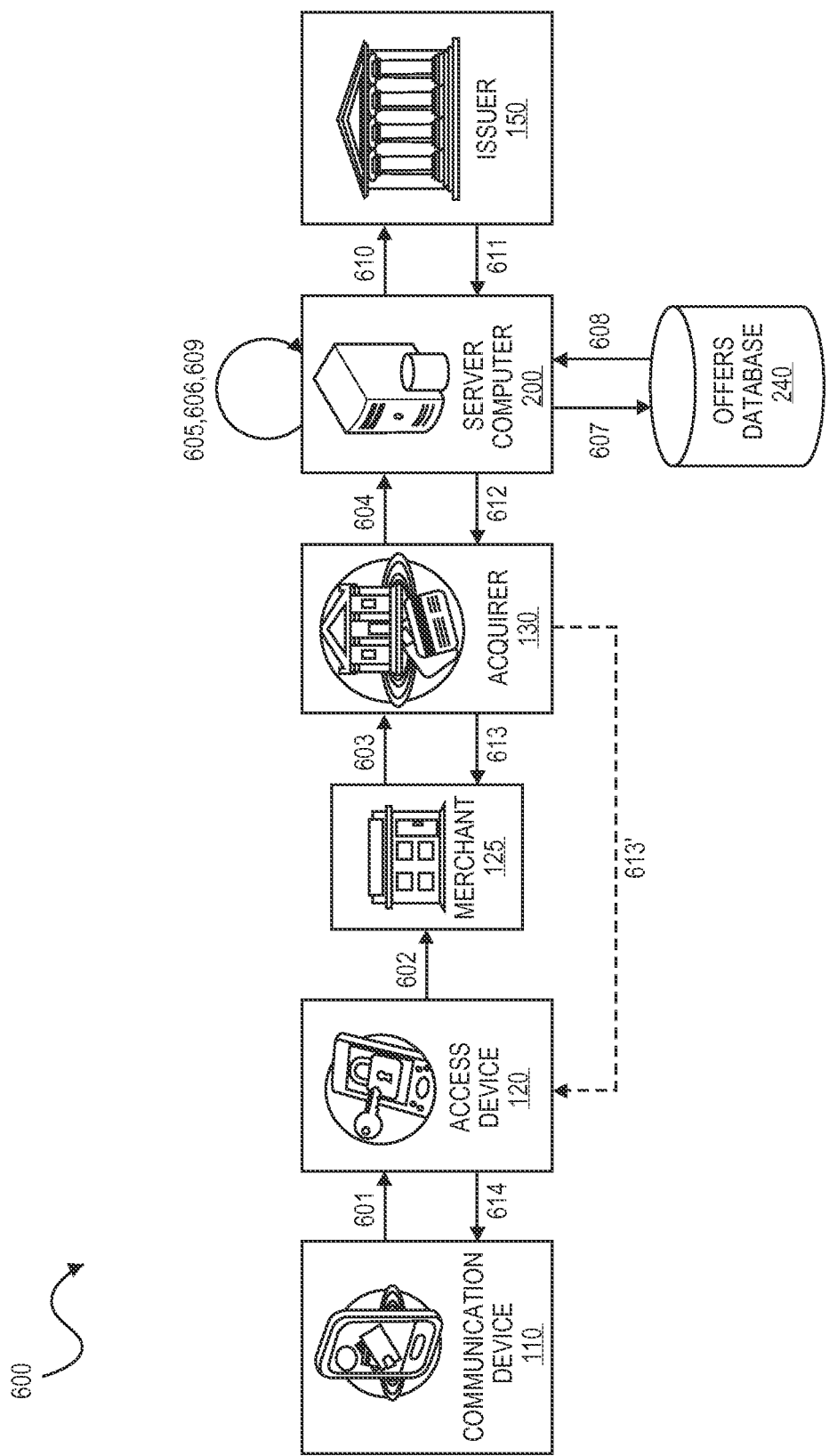
FIG. 6 is a flow diagram illustrating a system for facilitating a transaction involving a predetermined offer or discount, according to an embodiment of the present invention.

FIG. 6 is a flow diagram illustrating a system 600 for facilitating a transaction involving a predetermined offer or discount, according to an embodiment of the present invention. The system 600 can include communication device 110, access device 120, merchant 125, acquirer 130, server computer 200, issuer 150, and offers database 240. In some embodiments, server computer 200 may reside within payment process network 140 (FIG. 1). In some embodiments, the offers database 240 may be internal to the server computer 200, as illustrated in FIG. 2.

At step 601, a consumer may initiate a payment transaction using a communication device 110 or other payment device to interface with an access device 120 at a merchant 125. The communication device 110 may interface with the access device 120 using, for example, near-field communication (NFC). For example, the consumer may use the communication device 110 to initiate the payment transaction by waving the communication device 110 by the access device 120. The communication device 110 and the access device 120 may also interact using a contactless mode of operation (e.g., RF transmission). The communication device 110 may contain a token or other temporary credential associated with a payment card, and device data to initiate the payment transaction.

At step 602, the merchant 125 may receive the device data, token, and other pertinent transaction information from the access device 120. For example, when the communication device 110 is waved at the access device 120, the merchant 125 can receive the device data, token, and other pertinent transaction information from the access device 120.

At step 603, the merchant 125 may initiate an authorization request to the acquirer 130. The authorization request may include transmitting an authorization request message from the merchant 125 to the acquirer 130. The acquirer 130 may be an acquirer bank associated with the merchant 125. The authorization request message may include the token and an original transaction amount. In some embodiments, the access device 120 may directly send the authorization request message to the acquirer 130.

At step 604, the server computer 200 may receive the authorization request message with the token and the original transaction amount from the acquirer 130. The server computer 200 may be requested, by the acquirer 130, to authenticate the token data.

At step 605, upon authenticating the token data, the server computer 200 may exchange the token for a PAN in the authorization request message. The server computer 200 may query the account information database 250 (FIG. 2) in order to determine the PAN associated with the received token. Once the PAN is determined, the server computer 200 may replace the token data in the authorization request message with data representing the PAN.

At step 606, the server computer 200 may suspend or delay or "hold" transmission of the authorization request message to the issuer 150. The suspending or holding of the transmission may be for a predetermined period of time. For example, the server computer 200 may suspend the transmission for 200 ms in order to determine whether an offer is eligible for the transaction, as described below. In some embodiments, other durations of suspension time (e.g., 100 ms, 300 ms, 400 ms, 500 ms, etc.) may be used. Suspending the transaction only for a predetermined period of time is beneficial because the server computer 200 may resume processing of the authorization request a determination regarding an offer or discount cannot be made within the predetermined period of time. This prevents unnecessary delay of the authorization processing.

At step 607, the server computer 200 may query offers database 240 to determine if any offers are eligible for the transaction. The offers database 240 may include pre-staged offers from one or more digital wallet providers, merchants 125, issuers 150, etc. The offers database 240 may be updated with the pre-staged offers at a predefined interval or can be "pushed" to the offers database 240 from the one or more digital wallet providers, merchants 125, issuers 150, etc. The server computer 200 may access the offers database 240 to determine whether an eligible offer or discount associated with the transaction exists, or determine that no such offer or discount is eligible. The eligibility of the offer or discount may be based on specifics of the transaction, such as the payment card used, the merchant 125, the acquirer 130, the type of good or service involved in the transaction, etc. For example, the offers database 240 may include an offer from a digital wallet provider for a 10% discount on any $100 or more purchase at a restaurant. The offer or discount can be a fixed dollar amount, a percentage, a variable dollar amount, or other type of function to offset the transaction amount.

At step 608, the server computer 200 may pull the relevant offer data from the offers database 240. Using the example above, the server computer 200 may offer data from the offers database 240 that represents a 10% discount for the transaction because the transaction total is $100 and the merchant 125 is a restaurant. If no offer data is available or eligible to be pulled from the offers database 240, the server computer 200 may continue with the authorization request processing using the original transaction amount in the authorization request message.

At step 609, the server computer 200 adjusts the amount in the authorization request message to reflect the determined offer or discount. For example, the server computer 200 may adjust the original transaction amount by 10% (e.g., $10) based on the discount information pulled from the offers database 240. That is, the server computer 200 may adjust the authorization request message to include $90 as the transaction amount, instead of the $100 original transaction amount.

At step 610, the server computer 200 may transmit the adjusted authorization request message to the issuer 150. If the authorization request includes information about the offer, that information may be removed before submitting the authorization request message to the issuer. The authorization request message may also include the PAN, which the server computer 200 translated from the token in step 405. The issuer may determine whether to approve or deny the transaction based on data received in the authorization request message and using a variety of techniques well known in the art, e.g., risk analysis.

At step 611, the server computer 200 may receive an authorization response message from the issuer 150. The authorization response may indicate to the server computer 200 that the issuer 150 has either approved or denied the adjusted transaction amount (e.g., $90).

At step 612, the server computer 200 may transmit the authorization response message to the acquirer 130. The authorization response message may indicate offer details and that a portion of the original transaction amount is being provided by a third-party, e.g., a digital wallet provider or a merchant. The acquirer 130 may forward the authorization response message to the merchant 125 (step 613) or to the access device 120 (step 613'). An alert indicating that the transaction was approved, along with offer details, may be transmitted to the communication device 110 (step 614).

In some embodiments, system 600 may include one or more digital wallet providers, as illustrated in FIG. 5. At step 608, in addition to querying the offers database 240 for eligible offers, the server computer 200 may also establish communication with one or more of the digital wallet providers to request eligible offers. The information received from the digital wallet providers may be used in combination from the offers pulled from the offers database 240 to determine the best offer. Determination of the best offer can be based on highest amount, a combination offers, exclusive offers, etc. as described in detail with respect to FIG. 5.

Figure 7:
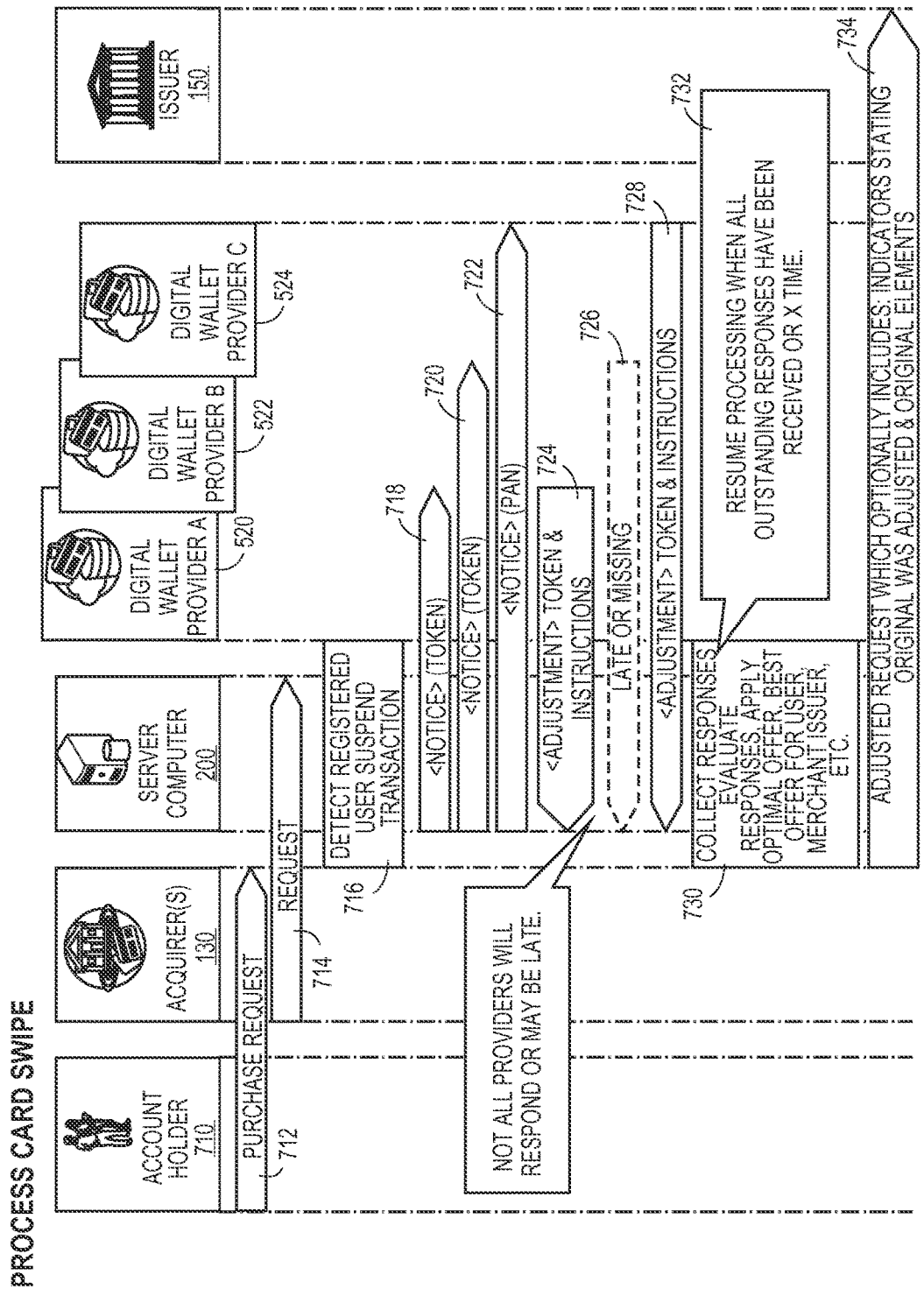
FIG. 7 is a flow diagram illustrating transaction message flows for a transaction involving one or more third-parties, according to an embodiment of the present invention.

FIG. 7 is a flow diagram 700 illustrating transaction message flows for a transaction involving one or more third-parties, according to an embodiment of the present invention. The flow diagram 700 includes a number of parties involved in the transaction. The flow diagram includes cardholder 710, acquirer 130, server computer 200, digital wallet provider A 520, digital wallet provider B 522, digital wallet provider C 524, and issuer 150.

At step 712, the cardholder 710 may initiate a purchase request for a service or good. The purchase request may be initiated at an access device at a merchant location (not shown). In another embodiment, the purchase request may be initiated via a communication device (not shown) belonging to the account holder 710. The purchase request may be sent in the form of an authorization request message, from the access device or communication device to the acquirer 130. The acquirer 130 may be associated with the merchant at which the transaction is taking place.

At step 714, the purchase request is transmitted from the acquirer to the server computer 200. The server computer 200 may be part of a payment processing network. The authorization request message may include a token that has a one to one mapping with a PAN associated with the payment card of the account holder 710.

At step 716, the server computer 200 may detect that a registered account holder is initiating the transaction, based on the received token in the authorization request message. The server computer 200 may temporarily suspend the transaction authorization for a predetermined period of time. In some embodiments, the predetermined period of time may be 200 ms. In some embodiments, other predetermined period of time (e.g., 100 ms, 300 ms, 400 ms, 500 ms, etc.) may be used.

At step 718, the server computer 200 may establish a communication channel with digital wallet provider A 520, based on a determination that the account holder's 710 payment account is enrolled with digital wallet provider A 520. The server computer 200 transmits a notice including the token to digital wallet provider A 520. The notice may be a request for the digital wallet provider A 520 to provide any relevant offers or discounts that are eligible for the transaction. The server computer 200 may wait for the predetermined period of time for digital wallet provider A 520 to provide a response with the offer data.

At step 720, the server computer 200 may establish a communication channel with digital wallet provider B 522, based on a determination that the account holder's 710 payment account is enrolled with digital wallet provider B 522. The server computer 200 transmits a notice including the token to digital wallet provider B 522. The notice may be a request for the digital wallet provider B 522 to provide any relevant offers or discounts that are eligible for the transaction. The server computer 200 may wait for the predetermined period of time for digital wallet provider B 522 to provide a response with the offer data.

At step 722, the server computer 200 may establish a communication channel with digital wallet provider C 524, based on a determination that the account holder's 710 payment card is enrolled with digital wallet provider C 524. The server computer 200 transmits a notice including the PAN to digital wallet provider C 524. In this example, the PAN is sent to digital wallet provider instead of a token. A PAN may be sent when the digital wallet provider does not support tokens. The notice may be a request for the digital wallet provider C 524 to provide any relevant offers or discounts that are eligible for the transaction. The server computer 200 may wait for the predetermined period of time for digital wallet provider C 524 to provide a response with the offer data.

At step 724, digital wallet provider A 520 may respond with an eligible offer. The response may include offer details and instructions along with a token. It can be appreciated that the digital wallet provider A 520 may have responded within the predetermined period of time (e.g., less than 200 ms, or less than other predetermined period of time such as 100 ms, 300 ms, 400 ms, 500 ms, etc.).

At step 726, digital wallet provider B 522 may have failed to respond with an eligible offer within the predetermined period of time. The server computer 200 may no longer listen for any response from digital wallet provider B after the predetermined period of time has elapsed.

At step 728, digital wallet provider C 524 may respond with an eligible offer. The response may include offer details and instructions along with a token. It can be appreciated that the digital wallet provider C 524 may have responded within the predetermined period of time (e.g., less than 200 ms, or less than other predetermined period of time such as 100 ms, 300 ms, 400 ms, 500 ms, etc.).

At step 730, the server computer 200 may collect the various responses from the digital wallet providers (steps 724, 726, and 728). The server computer 200 may determine the best offer based on any of the criteria mentioned above with respect to FIG. 5 and FIG. 6. For example, the server computer 200 may combine the offers received from digital wallet provider A 520 and digital wallet provider C 524. In another example, the server computer 200 may only use an offer from digital wallet provider A 520 if it cannot be combined with the offer from digital wallet provider C 524 (e.g., it may be an exclusive offer).

At step 732, the server computer 200 may replace transaction amount in the originally received authorization request message with an adjusted transaction amount reflecting the offer. For example, if an offer for $10 off is selected from digital wallet provider A 520, the server computer 200 may adjust the authorization request message to have a transaction amount of $90 (for a $100 original transaction). It can be appreciated that step 732 may occur at the expiration of the predetermined period of time (e.g., 200 ms, or at the expiration of other predetermined period of time such as 100 ms, 300 ms, 400 ms, 500 ms, etc.).

At step 734, the server computer 200 may transmit the adjusted authorization request message to the issuer 150 for further processing. The authorization request message may additionally include indicators stating that the original transaction amount was adjusted and may also include original elements from the original authorization request message. The issuer may then approve/deny the transaction based on the adjusted transaction amount.

Figure 8:
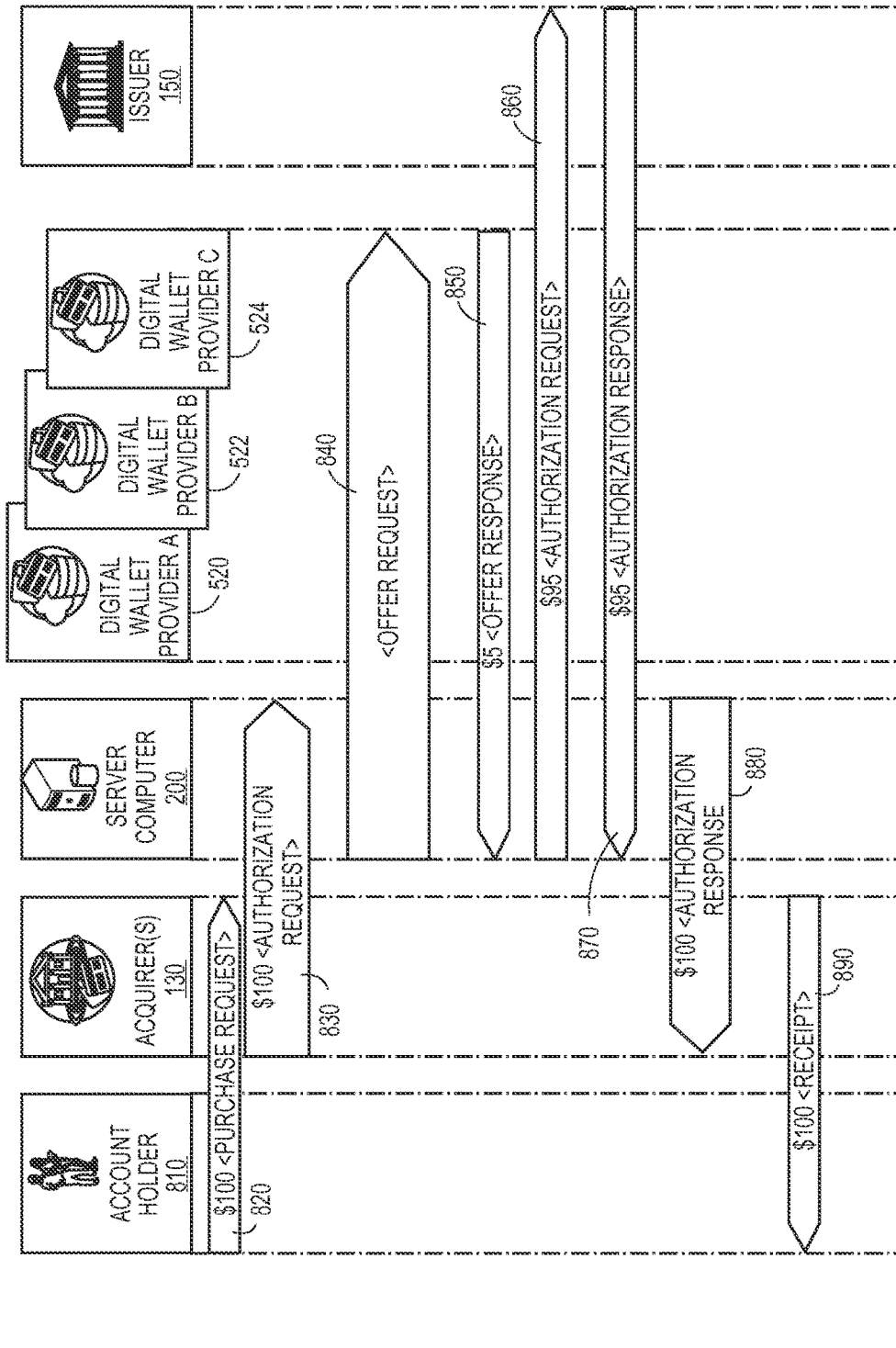
FIG. 8 is a flow diagram illustrating transaction amount flows for a transaction involving one or more third-parties, according to an embodiment of the present invention.

FIG. 8 is a flow diagram 800 illustrating transaction amount flows for a transaction involving one or more third-parties, according to an embodiment of the present invention. The flow diagram 800 includes a number of parties involved in the transaction. The flow diagram includes account holder 810, acquirer 130, server computer 200, digital wallet provider A 520, digital wallet provider B 522, digital wallet provider C 524, and issuer 150.

At step 820, the account holder 810 initiates a purchase request for a $100 transaction. The purchase request is transmitted from the account holder's 810 payment device or an access device at a merchant to the acquirer 130.

At step 830, the $100 authorization request is transmitted from the acquirer to the server computer 200. The server computer 200 may be part of a payment processing network. The authorization request message may include a token that has a one to one mapping with a PAN associated with the payment device of the account holder 810.

At step 840, the server computer 200 may establish a communication channel with the digital wallet providers and transmit an offer request. The selection of the digital wallet providers may be based on a determination that the account holder's 810 payment account is enrolled those digital wallet providers. The server computer 200 may wait for the predetermined period of time for the digital wallet providers to provide a response with the offer data.

At step 850, one or more of the wallet providers may respond to the offer. In this example, only digital wallet provider C 524 responds with a $5 offer. The other digital wallet providers may have responded with an indication that no offer exists, failed to respond within the predetermined period of time, or responded after the predetermined period of time expired. The server computer 200 receives the offer response from digital wallet provider C 524.

At step 860, the server computer 200 sends an adjusted authorization request to the issuer 150. The adjusted authorization request includes an adjusted transaction amount that reflects the offer or discount. In this example, the transaction amount is adjusted to $95 to reflect the $5 discount from digital wallet provider C 524.

At step 870, the issuer 150 responds to the authorization request with an authorization response message to the server computer 200. The authorization response message includes information about whether the issuer approved or denied the transaction based on the adjusted transaction amount. In this case, the authorization response message may be an approval for $95, meaning at the time of clearing and settling the issuer will settle for $95.

At step 880, the server computer 200 transmits an authorization response to the acquirer 130. However, the authorization response includes the original transaction amount of $100. The server computer 200 may adjust the transaction amount in the authorization response message to reflect the original transaction amount, since that is the transaction amount originally requested by the acquirer in the authorization request message of step 830. The authorization response indicates that the transaction is approved for $100, even though the issuer is settling for $95 and the remaining $5 will be cleared and settled from digital wallet provider C 524.

At step 890, the acquirer 130 may send receipt data to the account holder 810 indicating a transaction amount of $100. The receipt data may include the last 4 digits of the PAN and other pertinent merchant information. The receipt data may be sent to a communication device belonging to the account holder 810 or may be printed at an access device at a merchant.

At the time of clearing and settling, the issuer 150 may settle for $95 and digital wallet provider C 524 may settle for $5.

IV. Exemplary Methods

Figure 9:
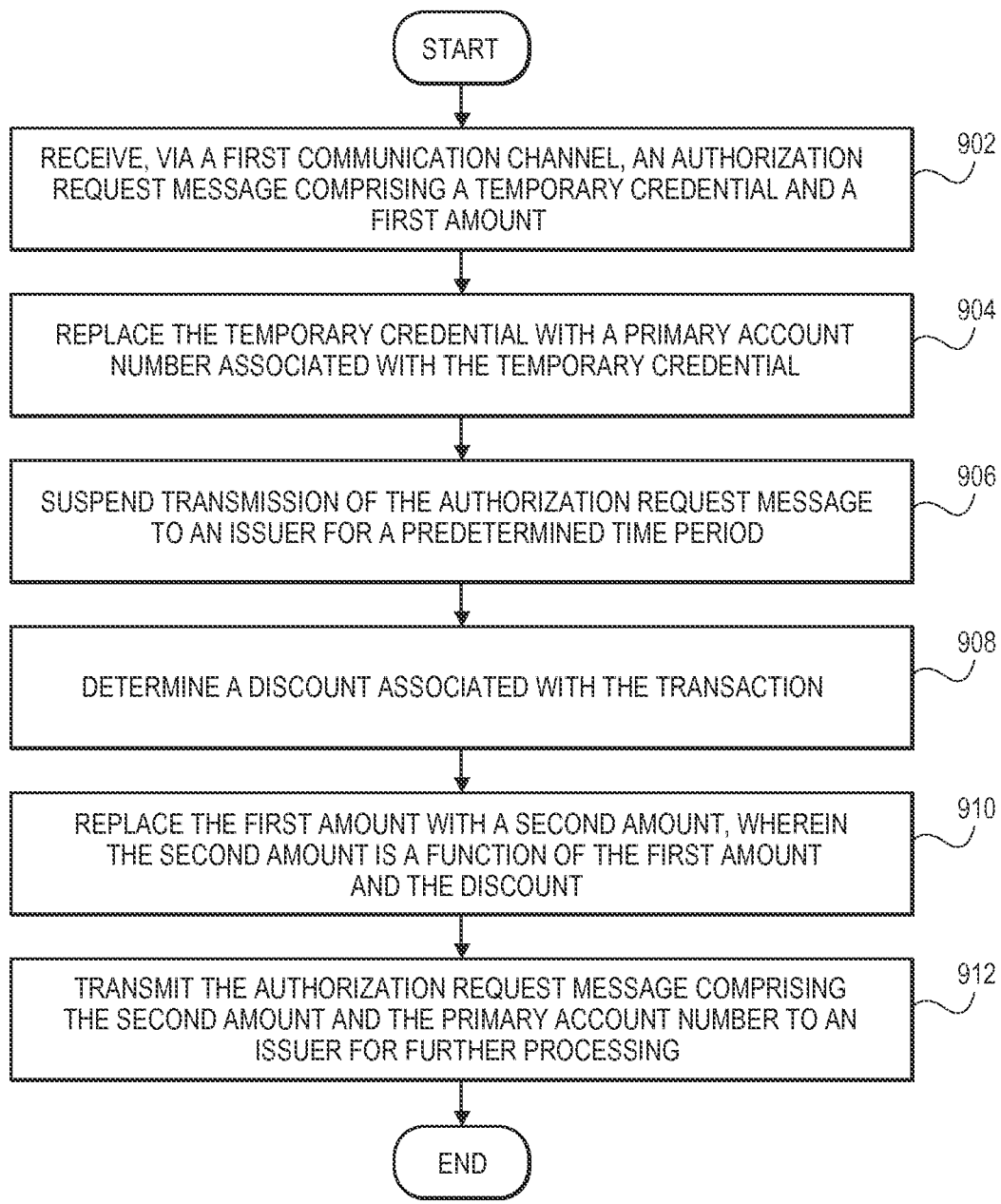
FIG. 9 is a flow diagram illustrating a method for facilitating a transaction involving one or more third-parties, according to an embodiment of the present invention.

FIG. 9 is a flow diagram illustrating a method 900 for facilitating a transaction involving one or more third-parties, according to an embodiment of the present invention. The method 900 is performed by processing logic that may comprise hardware (circuitry, dedicated logic, etc.), software (such as is run on a general purpose computing system or a dedicated machine), firmware (embedded software), or any combination thereof. In certain embodiments, the method 900 is performed by the server computer 200 or the payment processing network 140 of FIG. 1.

The method 900 may begin when a user initiates a financial transaction using his or her payment device. Alternatively, the user may initiate the financial transaction at an access device. Upon the user initiating the financial transaction, the server computer may receive, via a first communication channel, an authorization request message including a temporary credential and a first transaction amount (Step 902). The temporary credential may be a token.

After the server computer receives the authorization request message, the server computer may replace the temporary credential with a primary account number associated with the temporary credential (Step 904). The primary account number may have a one-to-one mapping with the token.

After the server computer replaces the temporary credential with the primary account number, the server computer may suspend transmission of the authorization request message to an issuer for a predetermined period of time (Step 906). The predetermined period of time may be 200 ms, or other predetermined period of time such as 100 ms, 300 ms, 400 ms, 500 ms, etc. The server computer may not forward the authorization request message to the issuer until the predetermined period of time elapses.

After the server computer suspends transmission of the authorization request message, the server computer may determine a discount associated with the transaction (Step 908). The discount may be determined by establishing a communication channel with one or more third-parties, e.g., digital wallet providers. The discount may also be determined by querying a local offers database containing pre-staged offers. The server computer 200 may determine the best or optimal offer from the various sources. The second communication channel may operate using a different communication protocol or data transmission protocol than the first communication channel. The offer may be determined by choosing the largest offer or discount, combining multiple offers or discounts, or any other method that obtains a best or optimal offer. The determination of what is the best or optimal offer may be made from the viewpoint of the cardholder, issuer, payment processor network, merchant, or any other party involved in the transaction. If an offer cannot be determined within the predetermined period of time, the server computer may forward the authorization request message without any adjustments to the issuer for further processing.

After the server computer determines the discount, the server computer may replace the first amount with a second amount, wherein the second amount is a function of the first amount and the discount (Step 910). The discount may be a fixed value, a percentage, a variable value, etc.

After the server computer replaces the first amount with the second amount, the server computer may transmit the authorization request message including the second amount and the primary account number to an issuer for further processing.

It should be appreciated that the specific steps illustrated in FIG. 9 provide a particular method for facilitating a transaction involving one or more third-parties, according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 900.

V. Exemplary Systems

Figure 10:
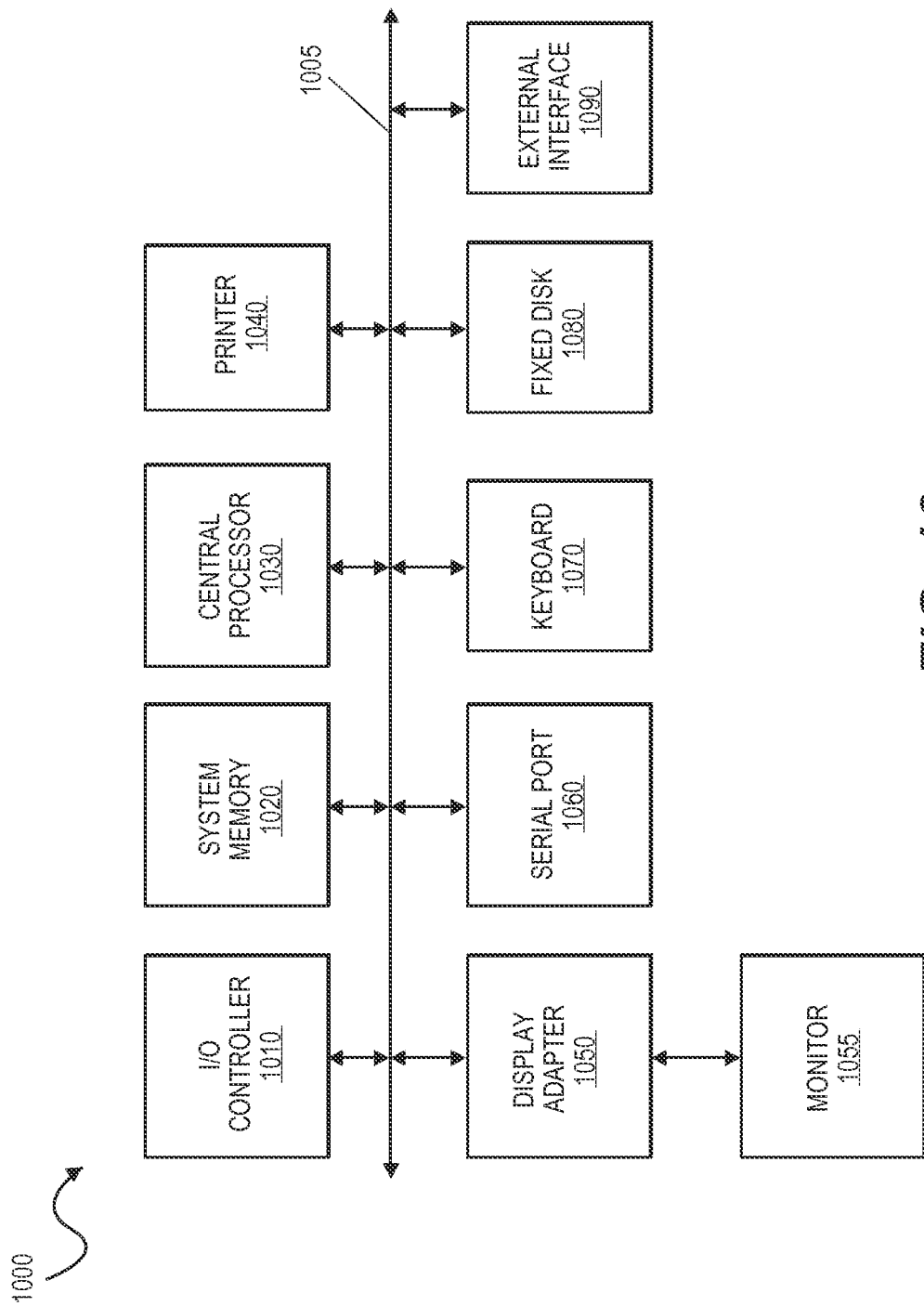
FIG. 10 is a diagram of a computer apparatus, according to an example embodiment.

FIG. 10 is a diagram of a computer apparatus 1000, according to an example embodiment. The various participants and elements in the previously described system diagram (e.g., the communication device, payment processing network, acquiring bank, issuing bank, server computer, etc., in FIG. 1) may use any suitable number of subsystems in the computer apparatus to facilitate the methods and/or functions described herein. Examples of such subsystems or components are shown in FIG. 10. The subsystems shown in FIG. 10 are interconnected via a system bus 1005. Additional subsystems such as a printer 1040, keyboard 1070, fixed disk 1080 (or other memory comprising computer-readable media), monitor 1055, which is coupled to display adapter 1050, and others are shown. Peripherals and input/output (I/O) devices (not shown), which couple to I/O controller 1010, can be connected to the computer system by any number of means known in the art, such as serial port 1060. For example, serial port 1060 or external interface 1090 can be used to connect the computer apparatus to a wide area network such as the Internet, a mouse input device, or a scanner. Alternatively, peripherals can be connected wirelessly (e.g., IR, Bluetooth, etc.). The interconnection via system bus allows the central processor 1030 to communicate with each subsystem and to control the execution of instructions from system memory 1020 or the fixed disk 1080, as well as the exchange of information between subsystems. The system memory 1020 and/or the fixed disk 1080 (e.g., hard disk, solid state drive, etc.) may embody a computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

One or more embodiments of the invention may be combined with one or more other embodiments of the invention without departing from the spirit and scope of the invention.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for facilitating a transaction, the method comprising:

receiving, at a server computer from an access device of a merchant, via a first communication channel, an authorization request message comprising at least a temporary credential and a first amount;

replacing, by the server computer, the temporary credential with a primary account number associated with the temporary credential;

suspending, by the server computer, transmission of the authorization request message to an issuer for a predetermined time period;

determining, by the server computer, a discount associated with the transaction;

replacing, by the server computer, the first amount with a second amount, wherein the second amount is the first amount minus the discount; and transmitting, by the server computer, the authorization request message comprising the second amount and the primary account number to the issuer for further processing.

2. The method of claim 1 wherein the determining step further comprises:

establishing, by the server computer, a second communication channel between the server computer and a third-party; and receiving, at the server computer, the discount associated with the transaction from the third-party.

3. The method of claim 2 wherein the second communication channel uses a different data transmission protocol than the first communication channel.

4. The method of claim 1 wherein the determining step further comprises:

establishing, by the server computer, a second communication channel between the server computer and a first third-party and a third communication channel between the server computer and a second third-party;

receiving, at the server computer, a first discount associated with the transaction from the first third-party and a second discount associated with the transaction from the second third-party; and determining, by the server computer, a larger discount between the first discount and the second discount.

5. The method of claim 1 wherein the determining step further comprises:

establishing, by the server computer, a second communication channel between the server computer and a first third-party and a third communication channel between the server computer and a second third-party;

receiving, at the server computer, a first discount associated with the transaction from the first third-party and a second discount associated with the transaction from the second third-party; and combining, by the server computer, the first discount and the second discount.

6. The method of claim 1 wherein the determining step further comprises accessing, by the server computer, a database comprising one or more discounts, wherein the one or more discounts are associated with one or more third-parties.

7. The method of claim 1 wherein the server computer is programmed to transmit a different authorization request message comprising the first amount and the primary account number to the issuer for further processing if the discount is not determined within the predetermined time period.

8. The method of claim 1 wherein the predetermined time is determined within 200 milliseconds.

9. The method of claim 1 further comprising correlating, by the server computer, an identifier received from a third-party to an identification system used by the server computer.

10. The method of claim 1 wherein the authorization request message includes an indicator indicating that the second amount is an adjusted amount of the first amount.

11. The method of claim 1, wherein the authorization request message is an ISO 8583 message.

12. The method of claim 1, further comprising:
receiving an authorization response message from the issuer; and
forwarding the authorization response message to the access device.

13. A server computer, comprising:
a processor; and
a non-transitory computer-readable storage medium, comprising code executable by the processor for implementing a method for authenticating a user for a transaction, the method comprising:
receiving, from an access device, via a first communication channel, an authorization request message comprising at least a temporary credential and a first amount;
replacing the temporary credential with a primary account number associated with the temporary credential;
suspending transmission of the authorization request message to an issuer for a predetermined time period;
determining a discount associated with the transaction;
replacing the first amount with a second amount, wherein the second amount is the first amount minus the discount; and
transmitting the authorization request message comprising the second amount and the primary account number to the issuer for further processing.

14. The server computer of claim 13 wherein the determining step further comprises:
establishing a second communication channel between the server computer and a third-party; and
receiving, at the server computer, the discount associated with the transaction from the third-party.

15. The server computer of claim 14 wherein the second communication channel uses a different data transmission protocol than the first communication channel.

16. The server computer of claim 13 wherein the determining step further comprises:
establishing a second communication channel between the server computer and a first third-party and a third communication channel between the server computer and a second third-party;
receiving a first discount associated with the transaction from the first third-party and a second discount associated with the transaction from the second third-party; and
determining a larger discount between the first discount and the second discount.

17. The server computer of claim 13 wherein the determining step further comprises:
establishing a second communication channel between the server computer and a first third-party and a third communication channel between the server computer and a second third-party;
receiving a first discount associated with the transaction from the first third-party and a second discount associated with the transaction from the second third-party; and
combining, via the server computer, the first discount and the second discount.

18. The server computer of claim 13 wherein the determining step further comprises accessing a database comprising one or more discounts, wherein the one or more discounts are associated with one or more third-parties.

19. The server computer of claim 13, wherein the server computer is programmed to transmit a different authorization request message comprising the first amount and the primary account number to the issuer for further processing if the discount is not determined within the predetermined time period.

20. The server computer of claim 13 wherein the predetermined time period is 200 milliseconds.

21. The server computer of claim 13 wherein the method further comprises correlating an identifier received from a third-party to an identification system used by the server computer.

* * * * *